(12) United States Patent
Mannen et al.

(10) Patent No.: US 8,089,487 B2
(45) Date of Patent: Jan. 3, 2012

(54) STORAGE CONTROL DEVICE AND STORAGE SYSTEM

(75) Inventors: Akihiro Mannen, Kawasaki (JP); Akira Nishimoto, Sagamihara (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1019 days.

(21) Appl. No.: 11/447,854

(22) Filed: Jun. 7, 2006

(65) Prior Publication Data

US 2007/0188507 A1 Aug. 16, 2007

(30) Foreign Application Priority Data

Feb. 14, 2006 (JP) ................................. 2006-035953

(51) Int. Cl.
*G09G 5/39* (2006.01)
*G06T 1/60* (2006.01)
(52) U.S. Cl. ........................ 345/532; 345/530
(58) Field of Classification Search ................... 717/168
See application file for complete search history.

(56) References Cited

U.S. PATENT DOCUMENTS

| | | | | |
|---|---|---|---|---|
| 4,137,565 | A * | 1/1979 | Mager et al. ..................... 710/22 |
| 5,720,028 | A | 2/1998 | Matsumoto et al. |
| 6,014,730 | A * | 1/2000 | Ohtsu ........................... 711/170 |
| 6,175,919 | B1 * | 1/2001 | Ha ................................ 713/100 |
| 6,205,445 | B1 * | 3/2001 | Tokuyama ....................... 707/10 |
| 6,343,324 | B1 * | 1/2002 | Hubis et al. ..................... 709/229 |
| 6,393,561 | B1 * | 5/2002 | Hagiwara et al. ............. 713/100 |
| 6,571,324 | B1 | 5/2003 | Elkington et al. |
| 6,745,281 | B1 * | 6/2004 | Saegusa ........................ 711/112 |
| 7,130,961 | B2 * | 10/2006 | Kanai et al. .................... 711/113 |
| 7,228,538 | B1 * | 6/2007 | Burton et al. .................. 717/170 |
| 7,305,670 | B2 * | 12/2007 | Ogasawara et al. ........... 717/171 |
| 2002/0133735 | A1 * | 9/2002 | McKean et al. .................... 714/5 |
| 2003/0158999 | A1 * | 8/2003 | Hauck et al. ................... 711/113 |
| 2004/0143829 | A1 | 7/2004 | Uchiumi et al. |
| 2004/0145766 | A1 * | 7/2004 | Sugishita et al. ............ 358/1.13 |
| 2004/0168167 | A1 * | 8/2004 | Ono .............................. 717/170 |
| 2004/0243994 | A1 * | 12/2004 | Nasu .............................. 717/171 |
| 2005/0076177 | A1 * | 4/2005 | Mori ............................. 711/113 |
| 2005/0100353 | A1 * | 5/2005 | Kawaura .......................... 399/8 |
| 2005/0182906 | A1 * | 8/2005 | Chatterjee et al. ............ 711/144 |
| 2005/0240854 | A1 * | 10/2005 | Nakagawa et al. ............ 714/758 |
| 2005/0288800 | A1 * | 12/2005 | Smith et al. ..................... 700/28 |

(Continued)

FOREIGN PATENT DOCUMENTS

EP 1 569 084 8/2005

(Continued)

*Primary Examiner* — Kee M Tung
*Assistant Examiner* — Jacinta M Crawford
(74) *Attorney, Agent, or Firm* — Antonelli, Terry, Stout & Kraus, LLP.

(57) ABSTRACT

The present invention enables to update a program in a storage control device while processing access requests, without imposing any burden on a host. When execution of updating of a program is commanded from a management terminal, an update control unit starts within the controller which is the object of updating. After a host I/F unit has been connected to an access request processing unit within another controller by a connection control unit, the update control unit updates a program which is stored in a program memory or a boot disk. When this updating is completed, the update control unit reconnects the host I/F unit to its access processing unit by the connection control unit. Since the stored contents of data memories are synchronized, the other access request processing unit can continue processing access requests from the host in place one access request processing unit.

15 Claims, 17 Drawing Sheets

U.S. PATENT DOCUMENTS

| | | |
|---|---|---|
| 2006/0117147 A1 * | 6/2006 | Blinick et al. ............... 711/145 |
| 2006/0206670 A1 * | 9/2006 | Tanoue .......................... 711/129 |
| 2006/0248308 A1 * | 11/2006 | Wang et al. ................... 711/173 |

FOREIGN PATENT DOCUMENTS

| | | |
|---|---|---|
| JP | 02-062623 | 3/1990 |
| JP | 08-335144 | 12/1996 |
| JP | 11-110301 | 4/1999 |
| JP | 2001-306412 | 11/2001 |
| JP | 2002-358167 | 12/2002 |
| JP | 2003-502751 | 1/2003 |
| JP | 2004-151761 | 5/2004 |
| JP | 2005-242574 | 9/2005 |
| JP | 2006-031312 | 2/2006 |

* cited by examiner

STORAGE CONTROL DEVICE AND STORAGE SYSTEM

CROSS-REFERENCE TO RELATED APPLICATIONS

This application relates to and claims priority from Japanese Patent Application No. 2006-35953 filed on Feb. 14, 2006, the entire disclosure of which is incorporated herein by reference.

BACKGROUND OF THE INVENTION

The present invention relates to a storage control device and to a storage system.

Since a storage control device is a computer device which employs a micro computer, sometimes it becomes necessary to update its program. It is possible to update the program simply if it is possible temporarily to stop access requests from a host computers (hereinafter termed "hosts"). However, sometimes it is the case that it is not possible to stop the storage control device, in order to obtain continuous 24-hour 365-day operation therefrom.

Thus, a technique has been proposed (in Japanese Patent Laid-Open Publication 2005-242574) for updating of a program within the storage control device, with which there is no necessity to stop the flow of access requests from the hosts; in other words, there is no requirement to stop the operation of the storage control device.

With the technique described in this prior art document, a cluster structure is employed, and redundant paths are established between the hosts and the storage control device. Due to this, the program of one cluster is updated after failover from that one cluster to another cluster. Accordingly, with this prior art method, it is possible to update the program without stopping the storage control device.

However, with this prior art method, it is necessary to set redundant paths between the hosts and the storage control device, to provide a cluster structure in the storage control device, and to implement path control software and so on on the hosts in order to change over from the normal paths to the redundant paths. Due to this, the structure becomes more complicated, and the cost also increases.

SUMMARY OF THE INVENTION

The present invention has been conceived in the light of the above described problems, and its object is to provide a storage control device and a storage system, with which it is possible to update the program without informing any host device, and moreover using a simpler structure than in the prior art. Further objectives of the present invention will become clear from the subsequent description of its embodiments.

In order to solve the above described problem, the storage control device according to one aspect of the present invention is a storage control device which includes a plurality of controllers, with each of controller including: a host communication control unit for performing communication with a host device; a subordinate communication control unit for performing communication with a storage device; a program storage unit which stores a predetermined program; an access request processing unit which, when an access request has been received from the host device via the host communication control unit, processes the access request by accessing the storage device via the subordinate communication control unit, and by executing predetermined data processing based on the predetermined program; and a data storage unit which stores data which is used in the predetermined data processing; and the storage device further including: a mutual communication path for connecting the controllers; an update control unit for updating the predetermined program which is stored in the program storage unit; and a processing path changeover unit which, based on a command from the update control unit, processes an access request received by the host communication control unit of one of the controllers by means of the access request processing unit of another one of the controllers, by connecting the host communication control unit of one controller, of the controllers, to the access request processing unit of other controller, of the controllers, by means of the mutual communication path.

In an embodiment of the present invention, the processing path changeover unit is capable of changing over between: (1) a normal mode in which, during normal operation, the host communication control unit and the access request processing unit are connected in each controller; and (2) an updating mode in which, during updating of the predetermined program, the host communication control unit of the one controller is connected via the mutual communication path to the access request processing unit of the other controller.

In another embodiment of the present invention, there is further included a data synchronization unit which synchronizes the stored contents in the data storage unit of the one controller and the stored contents in the data storage unit of the other controller.

In another embodiment of the present invention, when the stored contents in the data storage unit of the one controller and the stored contents in the data storage unit of the other controller have been synchronized, the update control unit connects the host communication control unit of the one controller to the access request processing unit of the other controller via the mutual communication path by the processing path changeover unit.

In another embodiment of the present invention, the update control unit updates the predetermined program which is stored in the program storage unit of the one controller, when the host communication control unit of the one controller is connected, by the processing path changeover unit, to the access request processing unit of the other controller via the mutual communication path.

In another embodiment of the present invention, when the updating of the predetermined program has been completed, the update control unit reconnects the host communication control unit of the one controller to the access request processing unit of the one controller by the processing path changeover unit, after re-synchronizing the stored contents in the data storage unit of the one controller and the stored contents in the data storage unit of the other controller.

In another embodiment of the present invention, the processing path changeover unit and the update control unit operate within the one controller in which the updating of the predetermined program is performed.

In another embodiment of the present invention, there is further included an update program storage unit for storing a program for updating, which is used for updating the predetermined program.

In another embodiment of the present invention, the update control unit updates the predetermined program when execution of updating has been commanded.

In another embodiment of the present invention, when the execution of updating has been commanded, the update control unit receives and stores a program for updating which is used for updating the predetermined program, after connecting, by the processing path changeover unit, the host communication control unit of the one controller to the access request processing unit of the other controller via the mutual communication path.

In another embodiment of the present invention, when the execution of updating has been commanded, the update control unit receives and stores a program for updating which is used for updating the predetermined program, before connecting, by the processing path changeover unit, the host communication control unit of the one controller to the access request processing unit of the other controller via the mutual communication path.

In another embodiment of the present invention, the update control unit updates the predetermined program immediately, if the priority level set for a program for updating to update the predetermined program is higher than a predetermined threshold value, while updating the predetermined program based on the states of the controllers, if the priority level set for the program for updating is equal to or less than the predetermined threshold value.

In another embodiment of the present invention, the update control unit is commanded to execute updating from the host device, or from a management device which is different from the host device.

In another embodiment of the present invention, the mutual communication path is provided within a casing in which the controllers are provided.

The storage system according to another aspect of the present invention is a storage system which includes a host device which issues access requests, a storage control device which is connected to the host device via a network for data input and output, and a management device which is connected to the storage control device via a network for management, and this storage control device includes a plurality of controllers which are connected by a mutual communication path, and a storage device which is connected to the plurality of controllers.

(1) Each of the controllers includes: a host communication circuit for performing communication with the host device; a subordinate communication circuit for performing communication with the storage device; a processor which, when an access request has been received via the host communication circuit from the host device, accesses the storage device via the subordinate communication circuit, and performs predetermined data processing; a data memory which stores data used in the predetermined data processing; a bus for connecting together the host communication circuit, the subordinate communication circuit, the data memory, and the processor; and a bus changeover switch which is provided on the bus and is positioned between the host communication circuit and the processor, for, when the normal mode has been commanded, connecting the host communication circuit to the processor within the same controller, and, when the updating mode has been commanded, connecting the host communication circuit within the controller which is the origin of changing over via the mutual communication path to the processor within the controller which is the destination of changing over.

(2) The processor which is included in the controller which is the origin of changing over, on receipt of a command for execution of updating from the management device or the host device, operates the update control unit for updating a predetermined program which is used by the processor.

And (3) the update control unit executes: (3-1) a step of synchronizing stored contents in the data memory of the controller which is the origin of changing over and stored contents in the data memory of the controller which is the destination of changing over; (3-2) a step of changing over the bus changeover switch from the normal mode to the updating mode; (3-3) a step of updating the predetermined program by a program for updating which has been received from the management device or the host device; (3-4) a step of, when updating of the predetermined program has been completed, copying the stored contents of the data memory of the controller which is the destination of changing over to the data memory of the controller which is the origin of changing over, thus re-synchronizing both the stored contents; and (3-5) a step of, when the re-synchronizing has been completed, changing over the bus changeover switch from the updating mode to the normal mode.

In some cases, at least a portion of the various means, units, and steps of the present invention may be implemented by a computer program. And such a computer program may be distributed in the state of being fixed on some type of recording medium; or, alternatively, it may also be transmitted via a communication medium.

DESCRIPTION OF THE SPECIFIC EMBODIMENTS

In the following, various embodiments of the present invention will be explained with reference to the drawings. In these embodiments, as will be explained hereinafter, when updating the program on one of the controllers, only specific functions for processing access requests from its host are temporarily stopped, while processing of access requests is delegated to other ones of the controllers. And the changing over of the processing path is controlled by that one controller (the controller which is the object of updating).

Figure 1:
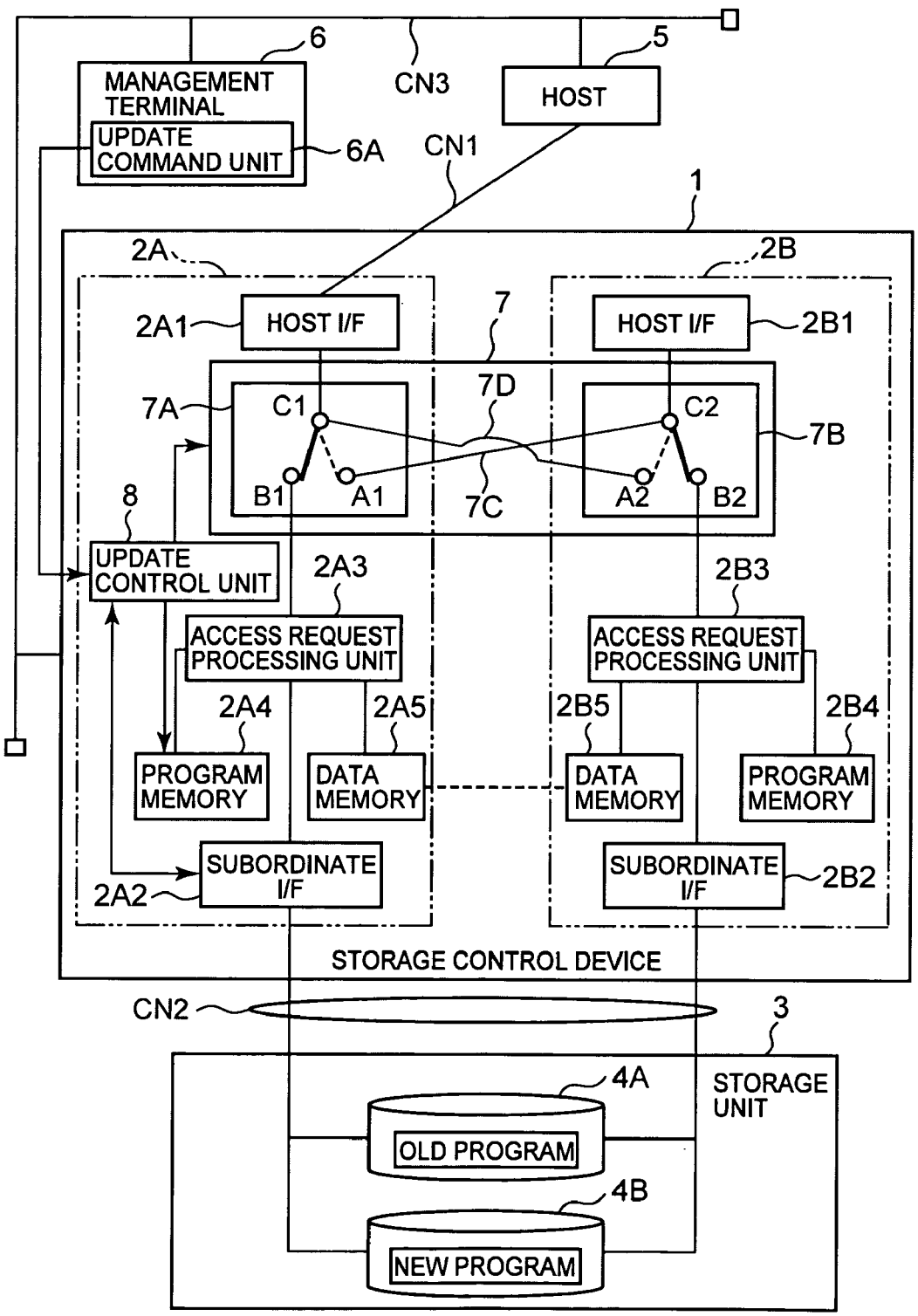
FIG. 1 is an explanatory figure showing the overall concept of a storage system according to an embodiment of the present invention.

First, FIG. 1 is an explanatory figure schematically showing the overall structure of a storage system according to this embodiment. This storage system may, for example, comprise a storage control device 1, a storage unit 3, a host 5, and a management terminal 6.

The storage control device 1 stores data which is utilized by the host 5. The storage control device 1 is connected to the host 5 via a communication network CN1. A LAN (Local Area Network) or a SAN (Storage Area Network) may, for example, be used as the communication network CN1. Furthermore, in the case of a SAN, either IP_SAN which can use TCP/IP (Transmission Control Protocol) or the like, or FC_SAN which uses FCP (Fiber Channel Protocol), may be used. It should be understood that it would also be acceptable to arrange to connect the storage control device 1 directly to the host 5, and to build the storage control device 1 as a so called DAS (Direct Attached Storage).

The storage control device 1 is connected to the storage unit 3 via a network CN2. An FC (Fibre Channel) or an SAS (Serial Attached SCSI) or the like may be employed as this communication network CN2. The storage unit 3, for example, may comprise a plurality of disk drives 4A, 4B which are disposed in an array format. These disk drives 4A, 4B, for example, may be made as hard disk drives or semiconductor memory drives or the like. Here, a program such as, for example, an OS (Operating System) or a microprogram for controlling the storage control device 1 or the like is stored in the boot disk 4A. And a program for updating may be stored in the disk 4B, which is a disk for updating.

Here, a physical storage device is constituted by one or a plurality of disk drives, and a logical volume is established over storage regions on this physical storage device. This logical volume constitutes an object of access by the host 5. A logical volume may be termed a logical storage device. User data which is used by the host 5 is stored in such a logical volume.

The host 5 is a computer device which, for example, may be a personal computer or a server computer or the like. This host 5 comprises an application program for using a group of data managed by the storage control device.

The management terminal 6 is a computer device which, for example, may be constituted by a personal computer or a portable information terminal or the like. This management terminal 6 is connected to each of the host 5 and the storage control device 1 by a communication network CN3 for management. The management terminal 6 comprises a update command unit 6A for commanding the storage control device 1 to update its program.

The structure of the storage control device 1 will now be explained. This storage control device 1 comprises a plurality of controllers 2A, 2B. Each of the controllers 2A, 2B has the same structure. The storage control device 1 is constituted by the redundant structure made up of the plurality of controllers 2A and 2B. However, for the convenience of explanation, in FIG. 1, in order to explain the method of program updating, an update control unit 8 is only shown in one of the controllers 2A.

The one controller 2A, for example, may comprise a host interface (hereinafter abbreviated as "I/F") unit 2A1, a subordinate I/F unit 2A2, an access request processing unit 2A3, a program memory 2A4, a data memory 2A5, and the update control unit 8.

The host I/F unit 2A1 corresponds to the "host communication control unit" or a "host communication circuit" of the Claims. This host I/F unit 2A1 is connected to the host 5 via the communication network CN1. And this host I/F unit 2A1 performs communication with the host 5.

The subordinate I/F unit 2A2 corresponds to the "subordinate communication control unit" or the "subordinate communication circuit" of the Claims. This subordinate I/F unit 2A2 is connected to the storage unit 3 via the communication network CN2. And this subordinate I/F unit 2A2 performs communication with the storage unit 3.

The access request processing unit 2A3, for example, may comprise a CPU (Central Processing Unit) and the like, and performs predetermined data processing according to access requests from the host 5. For example, read requests and write requests may be included in these access requests. When a read request has been issued from the host 5, the access request processing unit 2A3 reads out the data requested by the host 5 from the storage unit 3, and transmits this data to the host 5. And, when a write request has been issued from the host 5, the access request processing unit 2A3 stores the write data which it has received from the host 5 in the storage unit 3. When processing these access requests, the access request processing unit 2A3 performs conversions between the logical block addresses and the physical addresses on the disk drives, and the like.

The program memory 2A4, for example, may consist of a flash memory, a RAM (Read Only Memory), a ROM (Read Only Memory), or the like. This program memory 2A4 may be classified, by itself or along with the disk for updating 4B, as a "program storage unit". And, for example, a program like a BIOS (Basic Input/Output System), an OS, or a program like a microprogram for controlling the storage control device 1, may be stored in this program memory 2A4.

The data memory 2A5 corresponds to the "data storage unit" of the Claims. This data memory 2A5, for example, may be made from a RAM or the like. And, for example, data which has been read out from the host 5 or data which has been written from the host 5 (this is termed "user data") is stored in this data memory 2A5. Furthermore, in this data memory 2A5, there are also stored various types of control information, such as, for example, information for managing connection relationships between the host 5 and logical volumes, information for managing logical volumes, information for managing the disk drives, and the like.

Just like this controller 2A, the other controller 2B, for example, may comprise a host I/F unit 2B1, a subordinate I/F unit 2B2, an access request processing unit 2B3, a program memory 2B4, and a data memory 2B5. These elements 2B1 through 2B5 are the same as the above described elements 2A1 through 2A5 of the controller 2A, and accordingly duplicated explanation thereof will be curtailed.

A connection control unit 7 is a device which controls the state of connection between the controllers 2A and 2B. This connection control unit 7, for example, may comprise changeover switches 7A and 7B one of which is provided within each of the controllers 2A and 2B, and mutual connection paths 7C and 7D which are connected between these changeover switches 7A and 7B. These changeover switches 7A and 7B, and the connection control unit 7, correspond to the "processing path changeover unit" of the Claims.

The connection control unit 7 has a plurality of modes: a normal mode and an updating mode. In the case of the normal mode, the connection control unit 7 connects the host I/F unit and the access request processing unit within the same controller together. In other words, the host I/F unit 2A1 and the access request processing unit 2A3 are respectively connected together, and the host I/F unit 2B1 and the access request processing unit 2B3 are respectively connected together. As shown by way of example in FIG. 1, the host I/F unit 2A1 and the access request processing unit 2A3 are connected together by connecting together the port C1 and the port B1, and, in a similar manner, the host I/F unit 2B1 and the access request processing unit 2B3 are connected together by connecting together the port C2 and the port B2. It should be understood that, in FIG. 1, the structure of the connection control unit 7 is shown schematically by way of example, so as to facilitate easy explanation of the situation in which the processing paths are changed over during program updating.

On the other hand, in the case of the updating mode, the connection control unit 7 connects the host I/F unit within one of the controllers to the access request processing unit within the other controller. For example, when performing updating of the program for the controller 2A, the connection control unit 7 connects the host I/F unit 2A1 within the controller 2A which is the object of updating to the access request processing unit 2B3 within the controller 2B. In the same manner, when performing updating of the program for the controller 2B, the connection control unit 7 connects the host I/F unit 2B1 within the controller 2B which is the object of updating to the access request processing unit 2A3 within the controller 2A. In the example shown in FIG. 1, when the changeover switch 7A is changed over so as to connect together the port C1 and the port A1, the host I/F unit 2A1 is connected to the access request processing unit 2B3 via the mutual communication path 7C and the port C2 and the port B2. Similarly, when the changeover switch 7B is changed over so as to connect together the port C2 and the port A2, the host I/F unit 2B1 is connected to the access request processing unit 2A3 via the mutual communication path 7D and the port C1 and the port B1.

The update control unit 8 within the controller which is the subject of updating starts when updating execution of its program is commanded from the management terminal 6. By giving commands to the connection control unit 7, this update control unit 8 updates the program which is stored in the program memory 2A4 or the boot disk 4A, after it has connected the host I/F unit 2A1 to the access request processing unit 2B3 within the other controller 2B. Which program is updated depends on a command from the management terminal 6. And, when the updating process has been completed, this update control unit 8 returns the connection control unit 7 from the updating mode to the normal mode, and again connects the host I/F unit 2A1 to the access request processing unit 2A3 after updating.

Both when the connection control unit 7 shifts from the normal mode to the updating mode, and when it returns from the updating mode to the normal mode, the update control unit 8 makes the contents which are stored in the data memories 2A5 and 2B5 agree with one another. In other words, before connecting the host I/F unit 2A1 of the controller 2A to the access request processing unit 2B3 of the controller 2B, it copies the stored contents of the data memory 2A5 to the data memory 2B5. By doing this, it is possible for the access processing unit 2B3 to continue processing access requests from the host 5, instead of the access request processing unit 2A3. It should be understood that, sometimes, processing for making the stored contents of the data memories 2A5 and 2B5 agree with one another may already be performed. That is to say, if the data memories 2A5 and 2B5 are operating in synchronous mode, then the stored contents of the data memories 2A5 and 2B5 agree with one another.

The updating of the program within the controller 2A is completed during the time that the access request processing unit 2B3 is performing the processing of access requests as a delegate. Before again connecting the host I/F unit 2A1 to the access request processing unit 2A3 within the controller 2A, the update control unit 8 copies the stored contents of the data memory 2B5 into the data memory 2A5. By doing this, it is possible for the access request processing unit 2A3 again to perform processing of access requests from the host 5.

After the program for the controller 2A has been update, next, the program for the controller 2B is updated. Description of the method for doing so will be curtailed, since it is the same as the above.

Since this preferred embodiment of the present invention has the above described structure, it is possible to update the program without any interruption of the provision of storage service, comparatively simply and moreover at a low cost. In other words, with this embodiment, it is not necessary to establish any redundant path between the host 5 and the storage control device 1 as with the prior art, and it is not necessary to implement any path changeover software in the host 5. Accordingly, with this embodiment of the present invention, it is possible to update the program of the storage control device 1 without imposing any burden on the host 5, and moreover the convenience of use is enhanced. In the following, several preferred embodiments of the present invention will be described in detail.

EMBODIMENT 1

Figure 2:
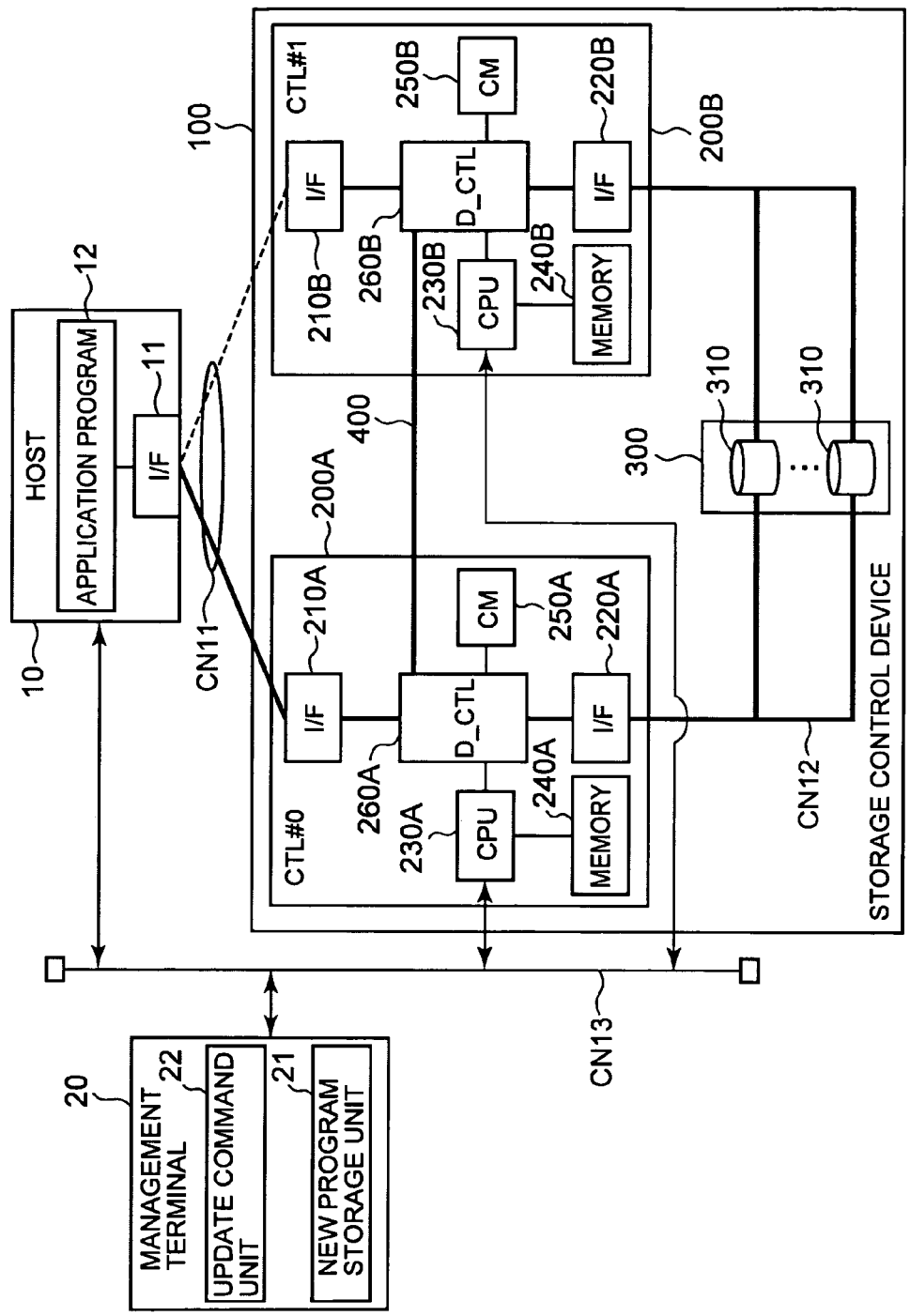
FIG. 2 is an explanatory figure showing the overall structure of this storage system.

FIG. 2 is an explanatory figure showing the overall structure of a storage system according to this first embodiment. This storage system, for example, may comprise a storage device 100, a host 10, and a management terminal 20. The storage control device 100 corresponds to the storage control device 1 in FIG. 1. Furthermore, the host 10 corresponds to the host 5 in FIG. 1, while the management terminal 20 corresponds to the management terminal 6 in FIG. 1.

The host 10 is a computer device such as, for example, a personal computer, a server computer, a main frame, an engineering work station, or the like. This host 10, for example, may comprise a communication I/F 11 which consists of a HBA (Host Bus Adapter) or a network card or the like, and an application program 12. Although, apart from these elements, there may also be included an OS or a user interface or the like, description thereof will here be omitted. The I/F 11 is connected to the storage control device 100 via a communication network CN11 such as, for example, a SAN or the like. And the application program 12 accesses the storage control device 100 via the I/F 11, and uses data (user data) which is stored in the storage control device 100.

The management terminal 20 manages the overall structure of the storage system and so on. This management terminal 20 is connected to both the host 10 and also the storage control device 100 via a network for management CN13, such as for example a LAN or the like. In more detail, via the network for management CN13, the management terminal 20 is connected to the controllers 200A and 200B within the storage control device 100. This management terminal 20 comprises a new program storage unit 21 and an update command unit 22.

The new program storage unit 21 is a device for storing a program for updating. Herein, for the sake of convenience, this program for updating will sometimes be termed the "new program", while the program which is being updated will sometimes be termed the "old program". This new program storage unit 21 may, for example, consist of a semiconductor memory device or a hard disk device.

The update command unit 22 is a device for commanding updating of the program in the storage control device 100. As will be described hereinafter, this update command unit 22, along with commanding the execution of updating, also transfers the program for updating which has been read out from the new program storage unit 21 to the storage control device 100.

The structure of the storage control device 100 will now be explained. This storage control device 100 comprises a plurality of controllers 200A, 200B which stand in the mutual relationship of being able to back up one another, and a storage unit 300.

Since these controllers 200A and 200B fundamentally have the same structure, this explanation will focus on the one controller 200A. These controllers 200A and 200B correspond to the controllers 2A and 2B in FIG. 1. It should be understood that, although both of the controllers 200A, 200B can be connected to the host 10, for this explanation of the present invention, only the controller 200A will be shown as being connected to the host 10.

The controller 200A (CTL#0 in the figure) comprises, for example, a host side I/F unit 210A, a disk side I/F unit 220A, a processor 230A ("CPU" in the figure), a memory 240A, a cache memory 250A ("CM" in the figure), and a data transfer control circuit 260A ("D_CTL" in the figure).

The host side I/F unit 210A corresponds to the host I/F unit 2A1 in FIG. 1. This host side I/F unit 210A is connected to the I/F 11 of the host 10 via a communication network CN11. And the host side I/F unit 210A receives access requests which have been issued from the host 10, and transmits the results of data processing to the host 10.

The disk side I/F unit 220A corresponds to the subordinate I/F unit 2A2 in FIG. 1. This disk side I/F unit 220A is connected to each of the disk drives 310 of the storage unit 300 via a communication network CN12 such as a FC or a SAS or the like. And the disk side I/F unit 220A reads out data from the storage unit 300, and writes data into the storage unit 300.

The processor 230A corresponds to the access request processing unit 2A3 in FIG. 1. Furthermore, this processor 230A implements at least a portion of the update control unit 8 and the connection control unit 7 in FIG. 1. By reading in and executing a program which is stored in the memory 240A, the processor 230A performs data processing according to access requests. Furthermore, the processor 230A performs an updating control procedure and so on as will be described hereinafter.

The memory 240A corresponds to the program memory 2A4 in FIG. 1. This memory 240A, for example, may consist of a flash memory, a ROM, a RAM, or the like. Various programs are stored in this memory 240A, such as, for example, a BIOS, an OS, a microprogram for control, or the like.

The cache memory 250A corresponds to the data memory 2A5 in FIG. 1. This cache memory 250A, for example, may consist of semiconductor memory s. And this cache memory 250A is backed up by electrical power from a battery power source. Accordingly, even if the main power supply for the storage control device 100 is interrupted for some time, the stored contents of the cache memory 250A are not lost during this time period, because they are backed up by the battery power source. For example, if the main power source is interrupted, it is possible to read the contents stored in the cache memory 250A into the storage unit 300 during the period while the cache memory 250A is being backed up by the battery power source. Furthermore, by making the cache memory 250A using non-volatile semiconductor memory, it is also possible to preserve the contents stored in the cache memory 250A, even if the main power source has been interrupted. As will be described hereinafter, user data and control information are stored in this cache memory 250A. Furthermore, the cache memory 250A also keeps the same stored contents as the cache memory 250B of the other controller 200B. In other words, the stored contents of the cache memories 250A and 250B are synchronized.

The data transfer control circuit 260A controls data transfer between the I/F units 210A and 220A, the processor 230A, and the cache memory 250A. The detailed operation of this data transfer control circuit 260A will be further described hereinafter.

Just like this controller 200A, the other controller 200B (CTL#1 in the figure) comprises a host side I/F unit 210B, a disk side I/F unit 220B, a processor 230B, a memory 240B, a cache memory 250B, and a data transfer control circuit 260B.

And a mutual communication path 400 is provided between the one data transfer control circuit 260A and the other data transfer control circuit 260B. This mutual communication path 400 may consist of a bus which connects between the controllers 200A and 200B. Exchange of data between the data transfer control circuits 260A and 260B is accordingly possible via this mutual communication path 400. It should be understood that, while the mutual communication path 400 may be constituted as an internal bus within the memory control device 100 as described above, alternatively, it may also be constituted as an externally fitted cable which connects from the outside of the casing of the storage control device 100 between the controllers 200A and 200B.

The storage unit 300 corresponds to the storage unit 3 of FIG. 1. This storage unit 300, for example, may consist of a plurality of disk drives 310 disposed in an array. For these disk drives 310 there may be used, for example, hard disk drives, semiconductor memory drives, optical disk drives, opto-magnetic disk drives, magnetic disk drives, or the like.

Furthermore, in the case of employing hard disk drives, it is possible to use hard disk drives of various types; for example, disks such as FC (Fiber Channel) disks, SATA (Serial AT Attachment) disks, SCSI (Small Computer System Interface) disks, SAS (Serial Attached SCSI) disks or the like may be utilized. Furthermore, it is also possible to mix storage devices of various different types within the storage unit 300.

Figure 3:
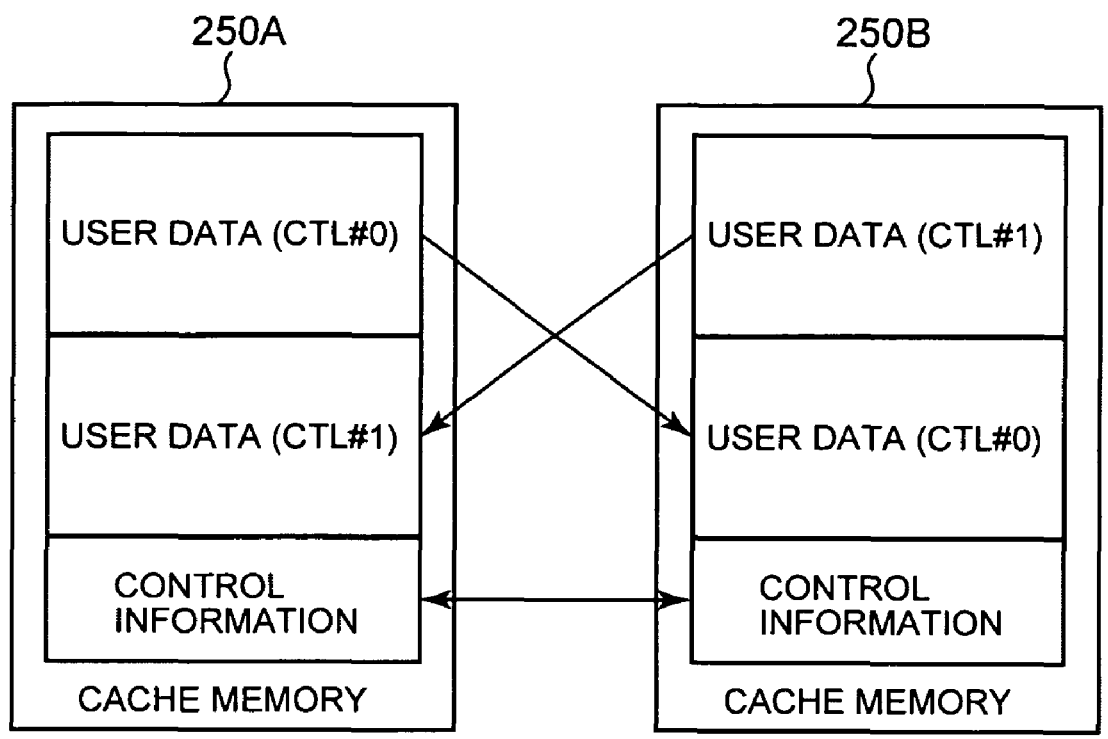
FIG. 3 is an explanatory figure showing the storage structure of a cache memory.

FIG. 3 schematically shows the storage structure of the cache memories 250A and 250B. As described above, in this storage control device 100, a dual controller construction is utilized, and moreover, due to the employment of the plurality of cache memories 250A and 250B, it is arranged for redundant storage of user data and control information to be possible.

In the one cache memory 250A, there are stored both the user data which are managed by the controller 200A and also the user data which are managed by the controller 200B. In the same manner, in the other cache memory 250B, there are likewise stored both the user data which are managed by the controller 200B and also the user data which are managed by the controller 200A. It should be understood that, according to requirements, it is possible either to perform synchronization processing between the cache memories 250A and 250B, or to cancel such synchronization processing.

Since the user data and the control information are stored redundantly by the cache memories 250A and 250B in this manner, accordingly if, for example, exceptionally the stored contents in one of these cache memories come to be lost, then it is possible to continue data processing in a seamlessly matched manner by using the stored contents of the other cache memory. Furthermore, it is also possible to restore the stored contents of the one cache memory by copying the stored contents of the other cache memory into the one cache memory.

Figure 4:
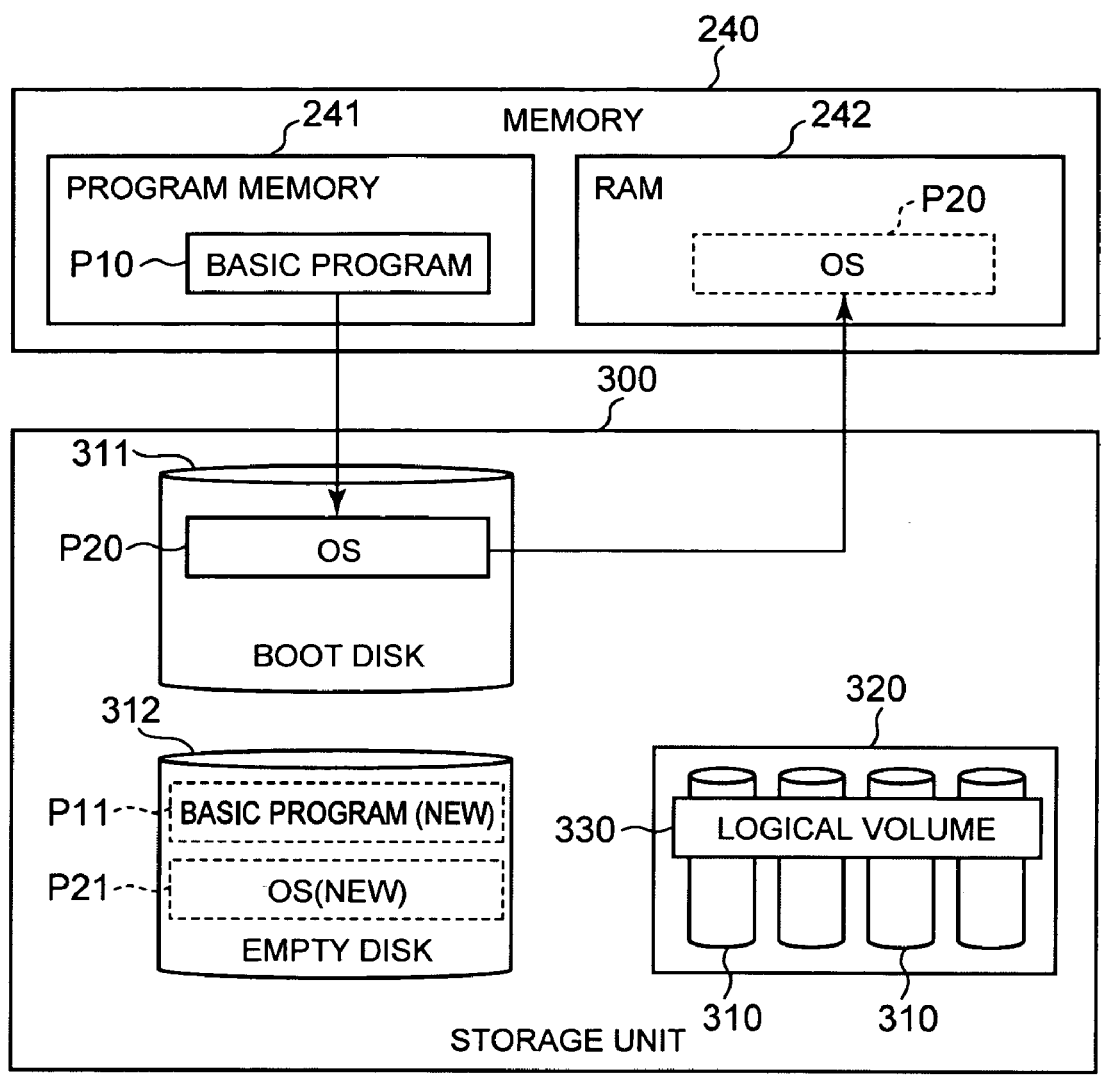
FIG. 4 is an explanatory figure showing the storage structure of a memory and a storage unit.

FIG. 4 shows an example of the storage structure of the memories 240A and 240B and the storage unit 300. It should be understood that, in the following explanation, the cases of the controllers 200A and 200B are not particularly distinguished, and accordingly the appended reference symbols "A" and "B" will be omitted. Thus, in FIG. 4, the memory is referred to by the symbol "240".

The memory 240 comprises, for example, a program memory 241 and a RAM 242. The program memory 241 consists of non-volatile semiconductor memory which can be rewritten, such as, for example, flash memory or the like. A basic control program P10 such as, for example, a BIOS or an IPL (Initial Program Loader) or the like is stored in this program memory 241. The RAM 242 consists of, for example, volatile semiconductor memory. An OS (P20) which is read in from a boot disk 311 is stored in this RAM 242.

As described above, the storage unit 300 comprises a plurality of disk drives 310. Here, that one of these disk drives, among the disk drives 310, on which the OS is stored, will be termed the boot disk 311. Furthermore, one of the disk drives which is empty will be termed an empty disk 312.

New programs P11, P21 which are used for program updating may be stored in the empty disk 312. Furthermore, by setting the empty disk 312 as a new boot disk, it is also possible to read into the RAM 242 an OS (P21) which has been stored on this empty disk 312.

As shown in the lower portion of FIG. 4, for example, a single group may be made up from a fixed number, like four or eight, of the disk drives 310. Such a group is termed a RAID group (a parity group) 320. Each of the disk drives 310 which make up such a RAID group 320 supplies its respective physical storage region, and thereby an ensemble of these physical storage regions is formed. Accordingly the RAID group 320 may be termed a physical storage device. Among the disk drives 310 which are members of the group 320, one or a plurality thereof may be used for storage of parity data, although this may differ according to the RAID level.

One or a plurality of logical volumes 330 may be set up in the physical storage region of the RAID group 320. Such a logical volume 330 is allocated to a communication port on the host I/F unit 210, and constitutes an object for access from the host 10. A logical volume 330 may be termed a logical storage device. The above described boot disk 311 and empty disk 312 may each be made as a physical disk drive 310, or, alternatively, they may be made as logical volumes 330. It should be understood that one or a plurality of logical volumes 330 may also be provided within a single disk drive 310.

Figure 5:
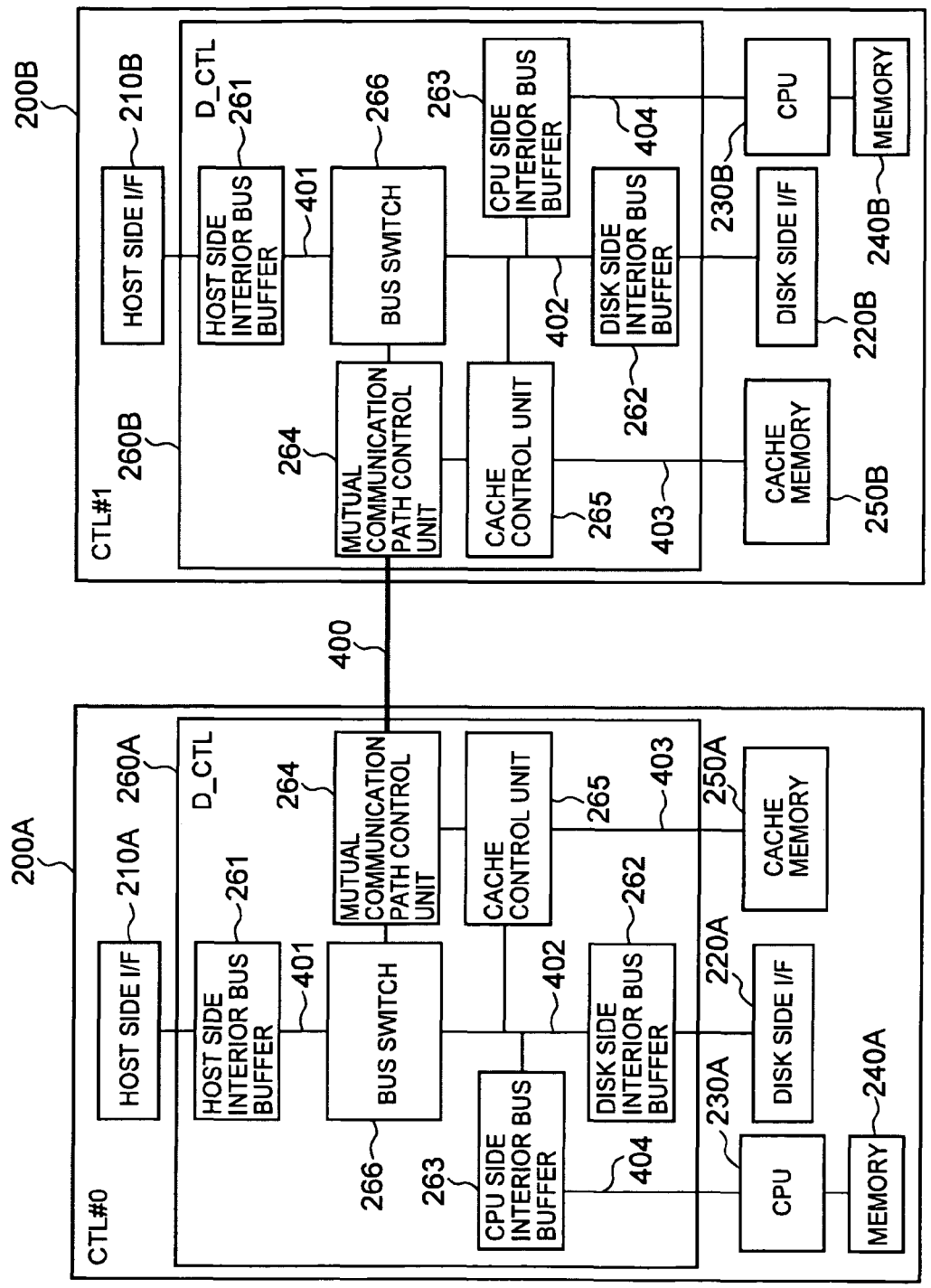
FIG. 5 is a block diagram showing the structure of a controller.

FIG. 5 is a block diagram showing the details of the data transfer control circuit 260. Both of the data transfer control circuits 260A and 260B have the same structure. Thus, to explain the one data transfer control circuit 260A, this data transfer control circuit 260A comprises a host side interior bus buffer 261, a disk side interior bus buffer 262, a processor side interior bus buffer 263, a mutual communication path control unit 264, a cache control unit 265, a bus switch 266, and buses 401, 402, 403, and 404.

And the host side interior bus buffer 261 and the bus switch 266 are connected together by the host side interior bus 401, while the disk side interior bus buffer 262 and the bus switch 266 are connected together by the disk side interior bus 402. In other words, the bus switch 266 is provided on the interior bus 262 which connects together the host side interior bus buffer 261 and the disk side interior bus buffer 262.

The mutual communication path control unit 264 is a device for performing data transfer via the mutual communication path 400. This mutual communication path control unit 264 is connected to both the bus switch 266 and the cache control unit 265. And the cache control unit 265 is connected to the cache memory 250A via the cache bus 403.

The cache control unit 265 is a device for controlling input and output of data to and from the cache memory 250A. This cache control unit 265 is able to exchange data with the cache control unit 265 of the other controller 200B via the mutual communication path control unit 264 and the mutual communication path 400. By doing this, the stored contents are synchronized between the cache memories 250A and 250B.

The bus switch 266 is a device for, on a command to change over the path, cutting off the interior bus 401 from the controller 200A, and connecting that interior bus 401 to the other controller 200B via the mutual communication path control unit 264 and the mutual communication path 400.

Figure 6:
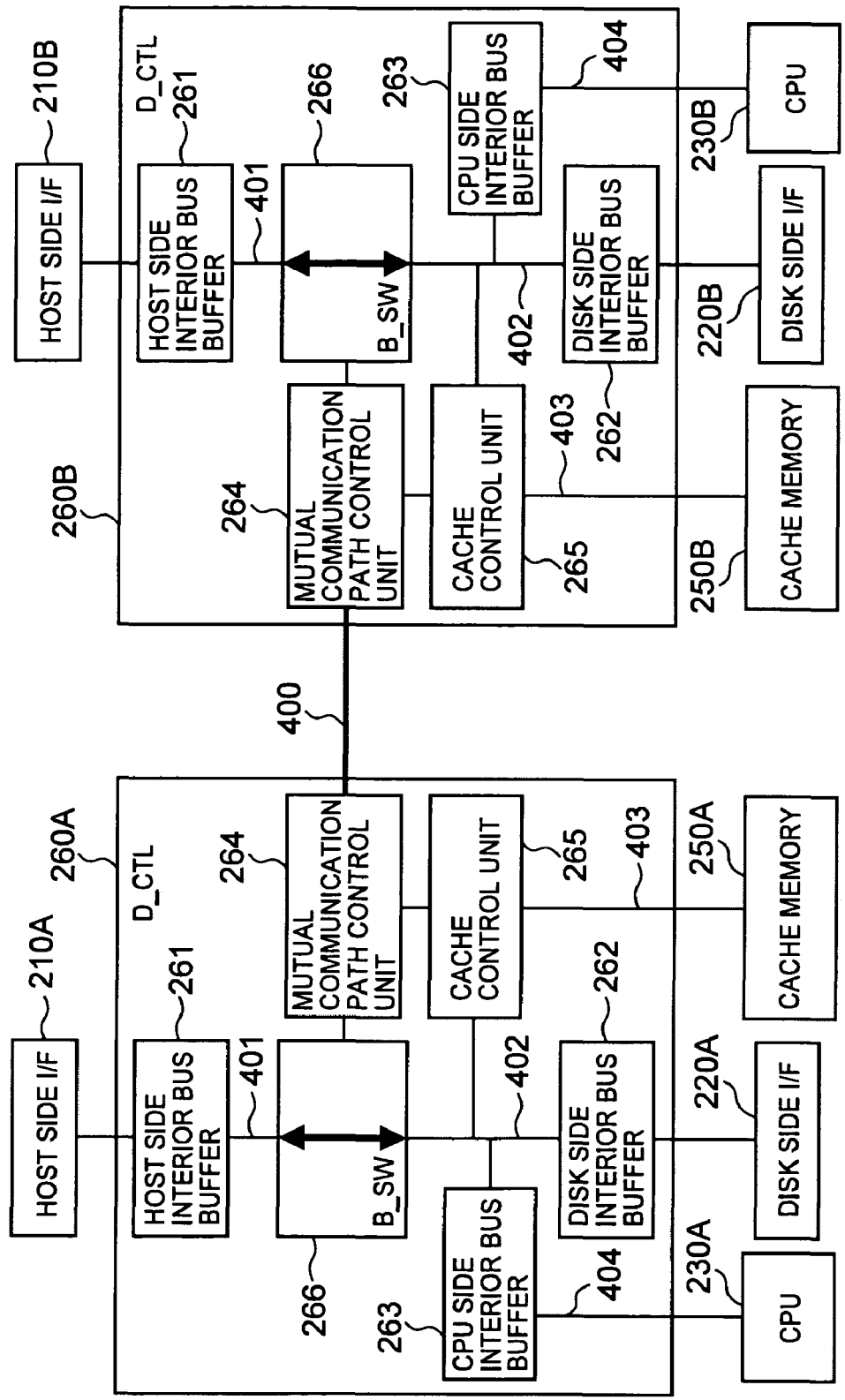
FIG. 6 is a block diagram showing the state of connection when a bus switch is in a normal mode.

FIG. 6 shows the state of the bus switch 266 ("B_SW" in the figure) in the normal state (the normal mode). By the normal state is meant that the program update control procedure is not being performed. In the normal mode, the bus switch 266 connects the host side interior bus 401 and the disk side interior bus 402. By doing this, within each of the controllers 200A and 200B, the host side I/F unit 210 is connected to the processor 230. To express this in another manner, in the case of the normal mode, each of the host side I/F unit 210 and the host side interior bus buffer 261 and the host side interior bus 401 is placed by the bus switch 266 under the control of the controller provided thereto.

Figure 7:
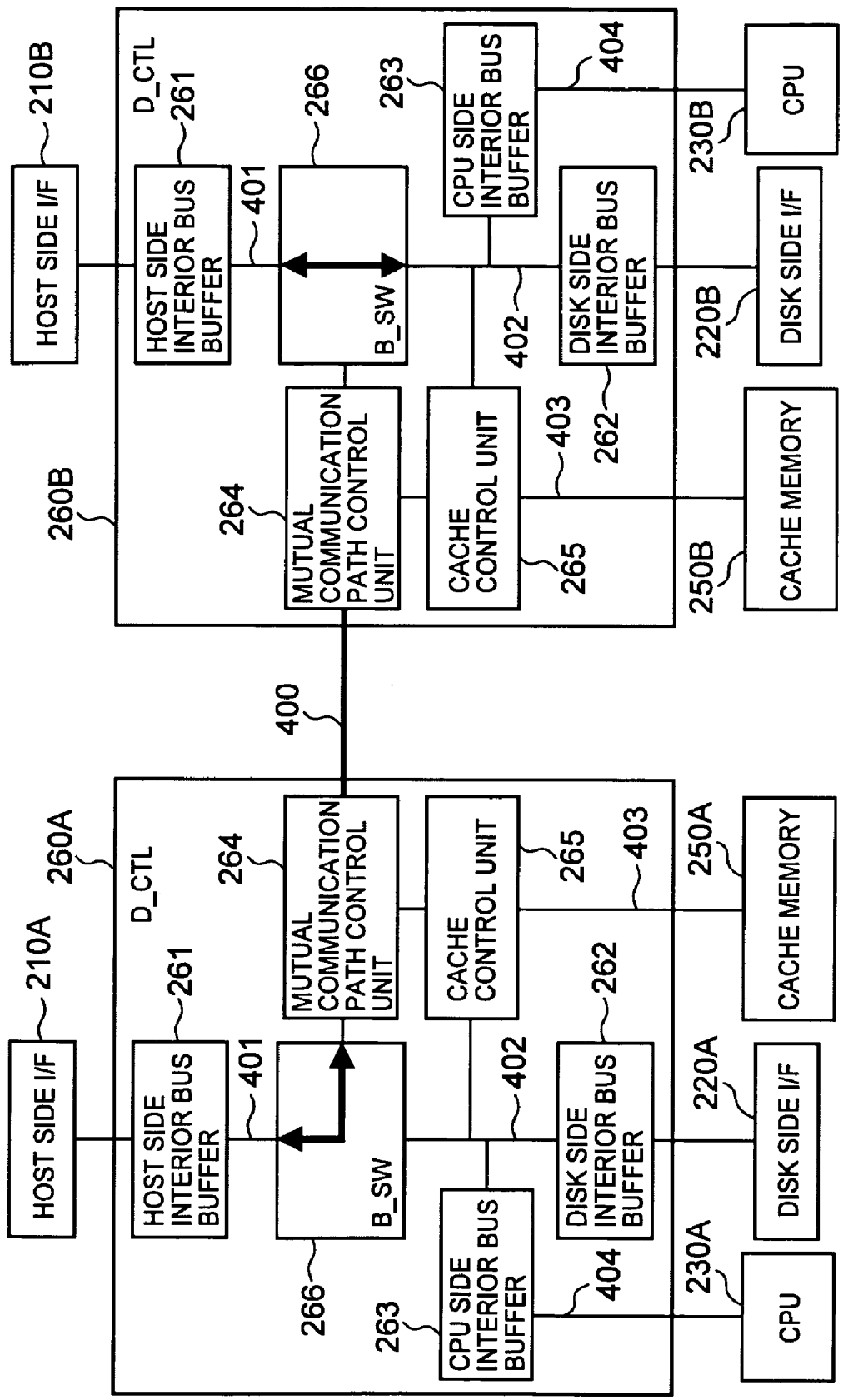
FIG. 7 is a block diagram showing the state of connection when, on the other hand, the bus switch is in an updating mode.

FIG. 7 is a block diagram showing the case when the bus switch 266 of the one controller 200A is changed over to the updating mode. By the updating mode is meant that the procedure of program updating is being performed. This updating mode may also, for example, be termed the connected unit changeover mode.

When updating the program on the side of the controller 200A, the processor 230A issues a command to the bus switch 266 within the controller 200A to proceed with program updating. This command is one which requests the controller 200A to shift from the normal mode to the updating mode. Based on this command, the bus switch 266 changes over the destination of connection for the host side interior bus 401 from the disk side interior bus 402 to the mutual communication path 400.

By doing this, the host side interior bus 401 connects together the interior buses 401 and 402 within the other controller 200B via the mutual communication path 400 and so on. Accordingly, the host side I/F unit 210A within the controller 200A is connected to the processor 250B within the controller 200B via the bus switch 266 within the controller 200A, the communication path 400, and the bus switch 266 within the controller 200B. Or, to express this in another manner, when the bus switch 266 is in the updating mode, each of the host side I/F unit 210 and the host side interior bus buffer 261 and the host side interior bus 401 comes to be placed thereby under the control of the other controller from the one which is provided thereto.

Next, the operation of this storage system will be explained. Since each of the flow charts described below shows a schematic summary of the operation, there are some differences from the actual program which is employed. It should also be understood that, in the figure, "step" is abbreviated as "S".

Figure 8:
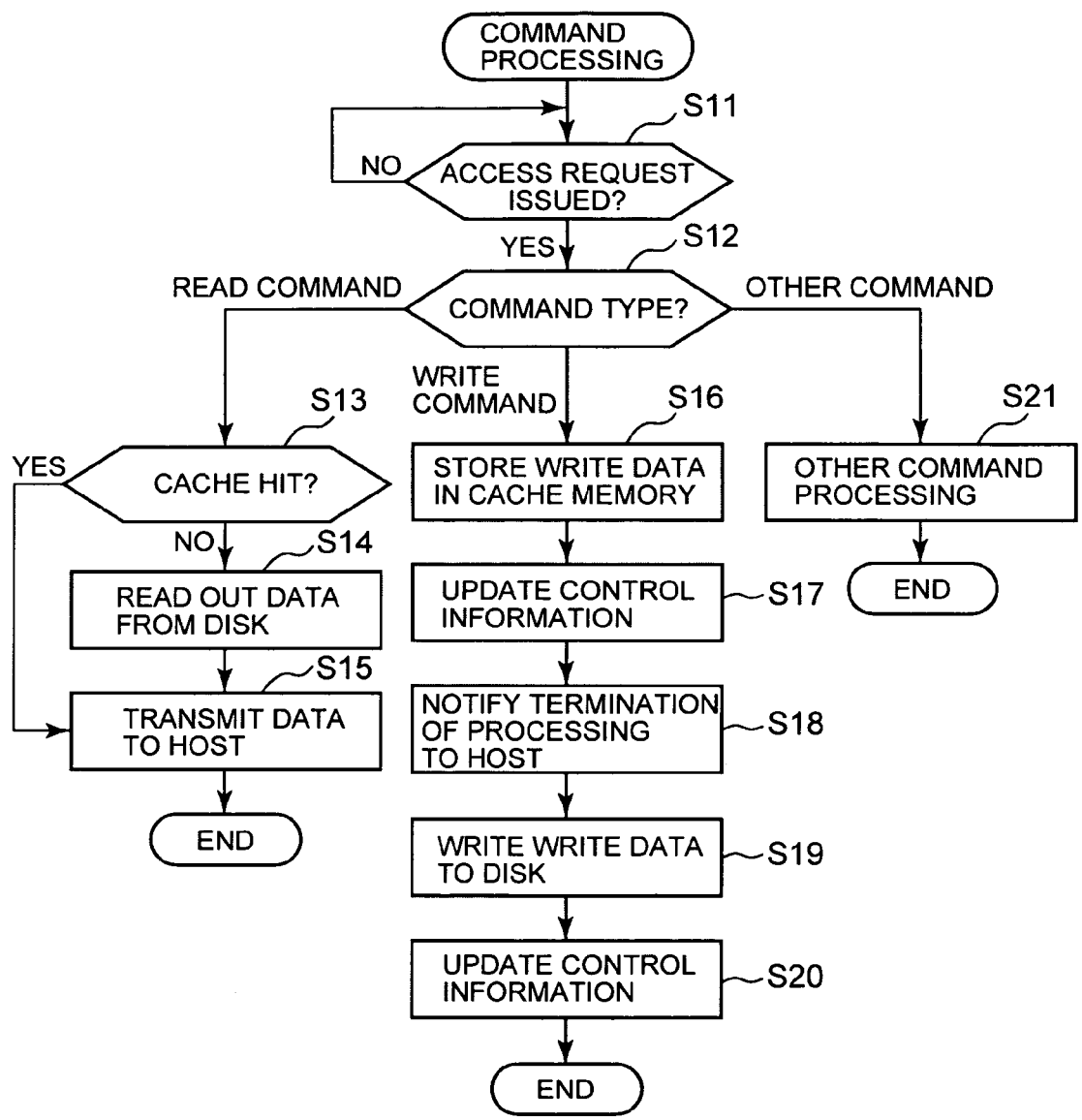
FIG. 8 is a flow chart for the processing of a command from a host.

FIG. 8 is a flow chart showing the flow of control for processing an access request (a command) which has been issued from the host 10. This processing is performed by the controller 200A within the storage control device 100. This is because, in this embodiment, the controller 200A is built to perform receipt and processing of commands from the host 10.

The controller 200A monitors (in a step S11) whether or not an access request has been issued from the host 10. When an access request has been issued from the host 10 (S11: YES), then the controller 200A decides on the type of command of this access request (in a step S12).

If a read command has been issued from the host 10, then the controller 200A decides (in a step S13) whether or not the data which has been requested from the host 10 is stored in the cache memory 250A. If the data which has been requested is stored in the cache memory 250A (S13: YES), then the controller 200A reads out this data from the cache memory 250A, and transmits it to the host 10 (in a step S15). On the other hand, if the data which has been requested from the host 10 is not stored in the cache memory 250A (S13: NO), then the controller 200A reads out the data which has been requested from the storage unit 300, and stores it in the cache memory 250A (in a step S14). And the controller 200A then transmits this data which has been read out from the storage unit 300 to the host 10 (in the step S15).

If a write command has been issued from the host 10, then the controller 200A receives the write data which has been transmitted from the host 10 and stores this write data in the cache memory 250A (in a step S16). And the controller 200A updates the control information which is stored in the cache memory 250A (in a step S17). Here, for example, the address for storage of the write data and the status of the write data (file dirty status prior to destage) and so on are updated.

And, at the time point that the write data has been stored in the cache memory 250A, the controller 200A notifies (in a step S18) the host 10 to the effect that the processing of the write command has been completed. Subsequently, the controller 200A writes (in a step S19) the write data which has been stored in the cache memory 250A to the predetermined disk drive 310 within the storage unit 300, at a suitable timing which it determines appropriately by itself. By the predetermined disk drive 310 is meant that disk drive which includes the logical volume 330 which is the destination for writing as specified by the host 10. It should be understood that, if parity data is generated as for example according to RAID5 or RAID6 or the like, then the controller 200A calculates and stores such parity data.

The processing for writing data into the disk drive 310 is termed "destage processing". The status of the write data which has thus been de-staged is changed from the dirty status to the clean status. When the de-staging processing has been finished, the controller 200A updates the status and so on of the write data (in a step S20). It should be understood that although here this method is employed, in which the host 10 is notified that the processing has been completed at the time point that the write data has been stored in the cache memory 250A —this is termed the write after method or the non-synchronized write method—this is not intended to be limitative of the present invention; it would also be acceptable to notify the host 10 of the completion of processing after having written the write data into the disk drive 310.

If the command which has been issued from the host 10 is neither a read command nor a write command, the controller 200A performs other command processing (in a step S21). As this other command processing there may be cited, for example, an enquiry command for querying the empty capacity or the status of a logical volume 330, or the like.

Figure 9:
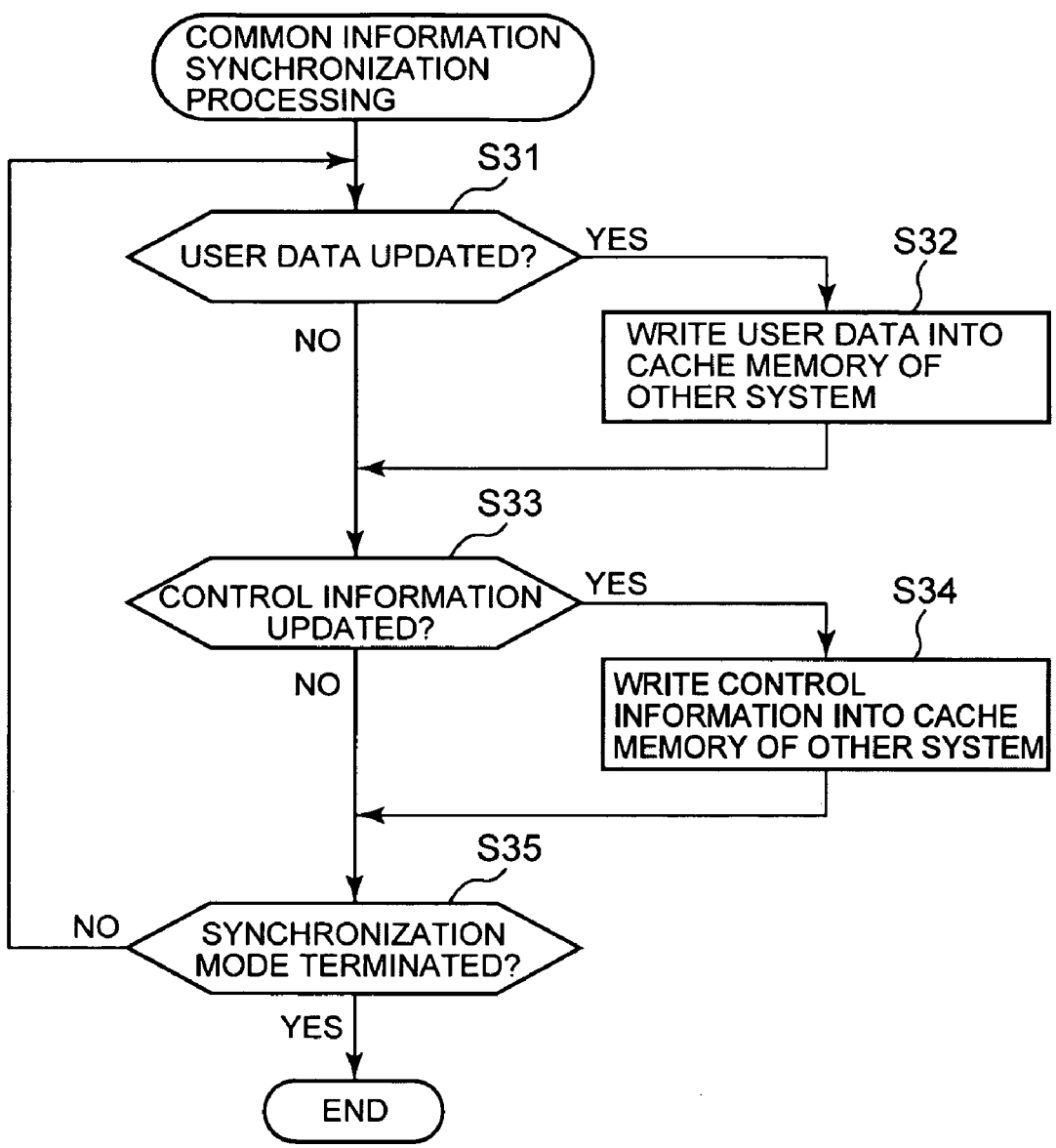
FIG. 9 is a flow chart showing the processing for synchronizing the storage contents of the cache memory.

FIG. 9 is a flow chart showing the synchronization processing for sharing information between the cache memories 250A and 250B. This synchronization processing may be performed, for example, if the user has set the system in advance to a synchronization mode.

The controller 200A decides (in a step S31) whether or not the user data has been updated. If the user data has been updated (S31:YES), then the controller 200A copies (in a step S32) this user data which has been updated into the cache memory 250B of the other system. In other words, the new user data which has been stored in the cache memory 250A is transferred from the cache control unit 265 to the other controller 200B via the mutual communication path control unit 264 and the mutual communication path 400, and is stored in its cache memory 250B.

Then, after the synchronization of the user data, the controller 200A decides (in a step S33) whether or not the control information has been updated. If the control information has been updated (S33: YES), then, in the same manner as in the case when the user data has been updated, the controller 200A copies (in a step S34) this control information which has been updated into the cache memory 250B of the other system. And the controller 200A decides whether or not the synchronization mode has been terminated (in a step S35). The stored contents of the cache memories 250A and 250B are synchronized until the synchronization mode terminates.

Figure 10:
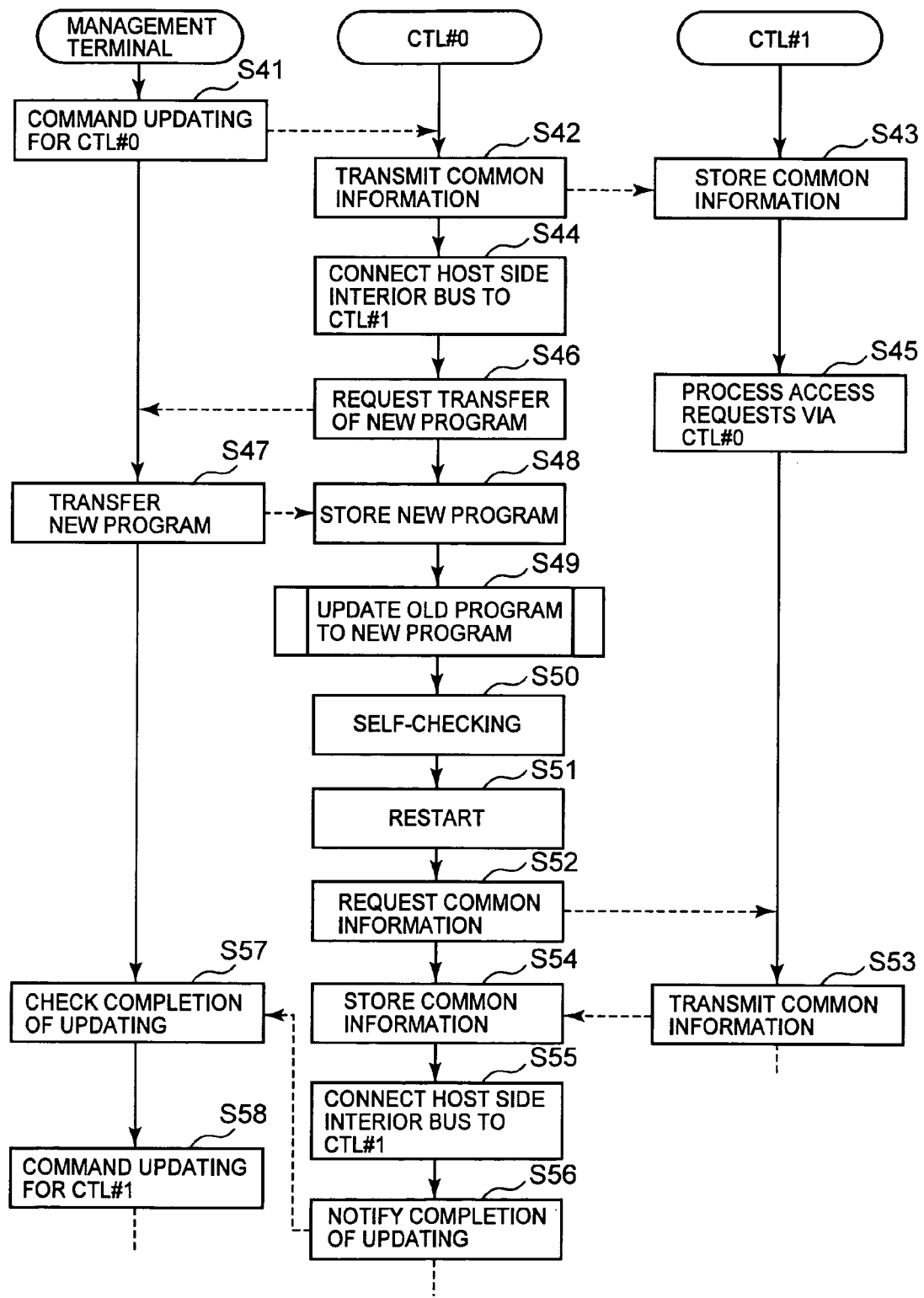
FIG. 10 is a flow chart showing the processing when updating a program.

FIG. 10 is a flow chart showing the update control procedure. When an improved OS or the like has been supplied from the vendor of the storage control device 100, the user commands (in a step S41) updating of the program in the controller 200A (CTL#0) using the update command unit 22 of the management terminal 20.

When the controller 200A receives (in a step S42) an update command, it transmits the common information to the controller 200B (CTL#1). Here, the common information is the stored contents of the cache memory 250A. And the controller 200B stores (in a step S43) the common information which it has received from the controller 200A in the cache memory 250B.

When the synchronization between the cache memories 250A and 250B in this manner has been completed, preparations are complete for changing over of the interior bus. It should be understood that it is possible for the steps S42 and S43 to be omitted if, at the time point when program updating execution is commanded, the cache memories 250A and 250B are already operating in the synchronization mode.

The controller 200A connects the host side interior bus 401 within the data transfer control circuit 260A to the interior bus of the data transfer control circuit 260B by changing over (in a step S44) the bus switch 266 from the normal mode to the updating mode. By doing this, the host side I/F unit 210A of the controller 200A is connected to the processor 230B of the controller 200B via the mutual communication path 400.

If, after the destination of connection of the host side interior bus 401 has been changed over, an access request has been issued from the host 10, then (in a step S45) it is processed by the controller 200B. The host 10 does not recognize that the destination for processing of access requests has shifted from the controller 200A to the controller 200B.

When the preparations on the side of the controller 200A have been completed for access requests which are received to be processed by the controller 200B, then the controller 200A requests (in a step S46) the management terminal 20 to transfer the new program. On receipt of this request, the management terminal 20 transmits (in a step S47) the program for updating which is stored in the new program storage unit 21 via the network for management CN13 to the controller 200A. Although the processor 230A of the controller 200A is separated from the host side I/F unit 210A, it is connected to the network for management CN13, so that it is able to perform communication in both directions with the management terminal 20.

The controller 200A stores (in a step S48) the new program which it has received from the management terminal 20 in, for example, the empty disk 312. And the controller 200A updates (in a step S49) the old program to the new program. This updating progressing will be described in greater detail hereinafter.

When the controller 200A has completed the updating of the program, it performs self-checking processing (in a step S50), and restarts (in a step S51). After the restart has been completed, the controller 200A requests (in a step S52) the controller 200B to transfer the command information. During the period while the program is being updated on the side of the controller 200A, access requests from the host 10 are processed (in the step S45) by the controller 200B. Accordingly, the newest user data and control information are stored by the cache memory 250B of the controller 200B.

The controller 200B transmits (in a step S53) the common information which is stored in the cache memory 250B to the controller 200A. And the controller 200A stores (in a step S54) this common information which it has received from the controller 200B in its cache memory 250A. It should be understood that the steps S52, S53, and S54 may be omitted, if the cache memory 250A and the cache memory 250B are already operating in the synchronized mode at the time point that a command is issued for updating execution of the program.

When re-synchronization of the cache memories 250A and 250B has been performed in this manner, preparations are undertaken for reconnecting the host side interior bus 401 to the side of the controller 200A. Here, the controller 200A changes over (in a step S55) the bus switch 266 from the updating mode to the normal mode. By doing this, the host side interior bus 401, the host side interior bus buffer 261, and the host side I/F unit 210A, which were placed under the control of the controller 200B, now come to be placed under the control of the controller 200A, as per normal operation.

And the controller 200A notifies (in a step S56) the management terminal 20 of the fact that the program updating on the side of the controller 200A has been completed normally. When the management terminal checks this notification of updating completion from the controller 200A (in a step S57), it commands the controller 200B to perform program updating (in a step S58). Thereafter, the same procedures as in the above steps S42 through S57 for the controller 200A are repeated for the controller 200B.

By doing this, the storage control device 100 is able to update the programs of the plurality of controllers 200A and 200B alternatingly. Access requests during the period of program updating are processed by the other controller from the one which processes them before program updating or after program updating. Accordingly the host 10 does not notice either that the destination for processing of access requests has been changed over, or that program updating has been performed, and it is able to continue issuing access requests as per normal, and to receive the results of processing them.

Figure 11:
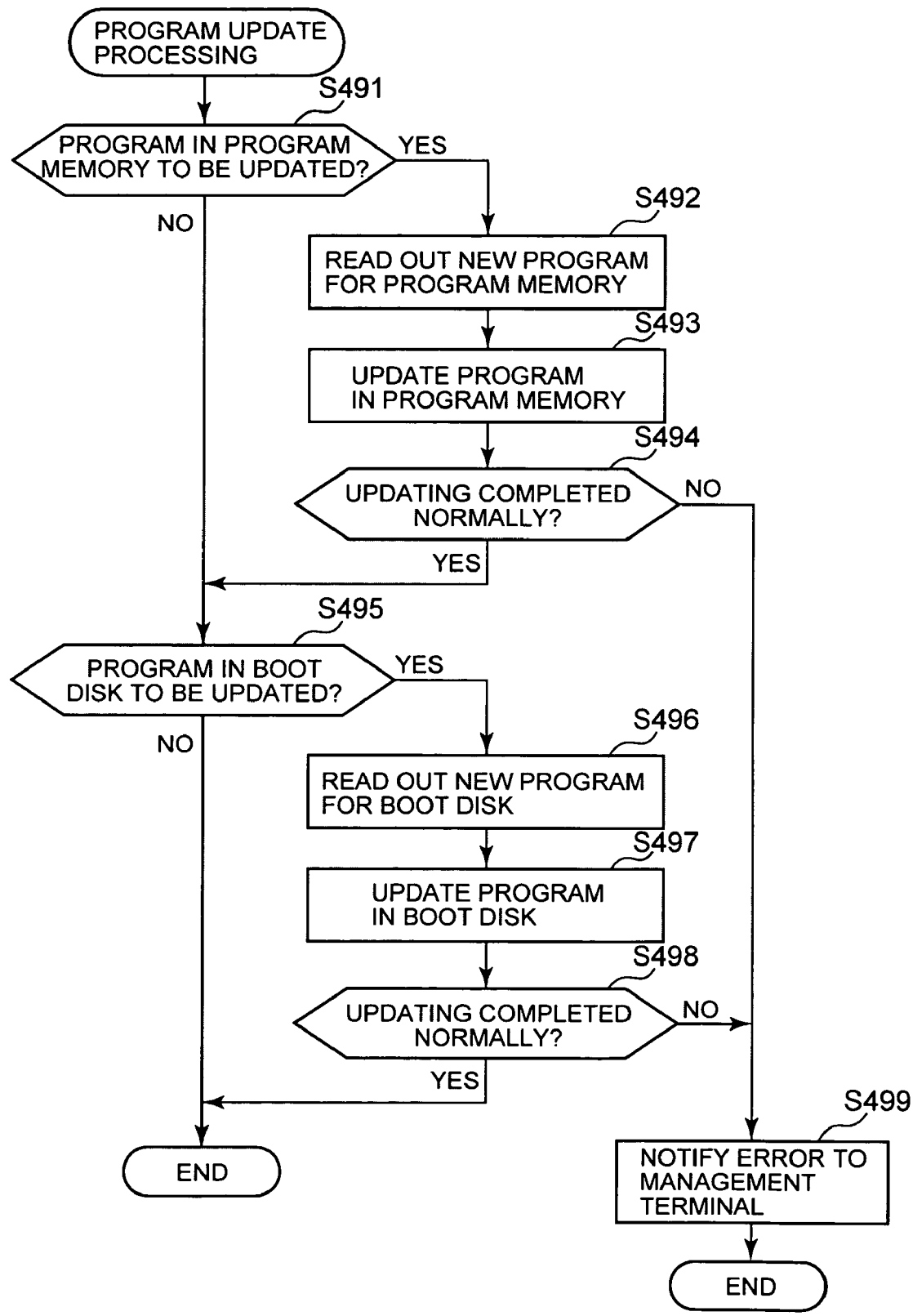
FIG. 11 is a flow chart showing the updating processing in FIG. 10.

FIG. 11 is a flow chart showing the flow of control for the update processing shown in S49 of FIG. 10. Here, by way of example, the case will be explained in which the controller 200A performs the main processing. First, the controller 200A decides (in a step S491) whether or not to update a program P10 within the program memory 241.

If a new program P11 which should replace the program P10 (the old program) in the program memory 241 is included in the new programs which have been received from the management terminal 20 (S491: YES), then the controller 200A reads out the new program P11 from the empty disk 312 (in a step S492). And the controller 200A replaces the old program P10 in the program memory 241 with the new program P11 (in a step S493). And the controller 200A decides (in a step S494) whether or not the updating of the program has been completed normally.

If updating has been completed normally (S494: YES), then the controller 200A decides whether or not the program P20 within the boot disk 311 is to be updated (in a step S495). If, instead of the program P20, a new program P21 has been received from the management terminal 20 (S495: YES), then the controller 200A reads out this new program P21 from the empty disk 312 (in a step S496), and replaces the program P20 (in a step S497).

The controller 200A decides (in a step S498) whether or not the program updating has been completed normally, and, if it has been completed normally (S498: YES), then this processing is terminated. On the other hand, if due to some cause an error has occurred in the program updating (S494: NO or S498: NO), then the controller 200A notifies this error to the management terminal 20 (S499). On receipt of this error notification, the management terminal 20 is able to re-issue the update command. It should be understood that, herein, program updating means updating of all of the programs, or of only a part thereof.

This embodiment, having a structure like that described above, furnishes the following beneficial effects. In this embodiment it is arranged, before proceeding with program updating, for the host side I/F unit 210A of the controller 200A which is the object of updating to be connected to the interior bus of the controller 200B which is the destination of processing delegation via the mutual communication path 400. Accordingly, there is no stoppage of access requests from the host 10 during the updating the program of the controller 200A, and it is possible to continue processing. Due to this, there is no requirement to provide any redundant path between the host 10 and the storage control device 100, and it is not necessary to perform any path changeover control or the like on the side of the host 10, so that it is possible to perform updating of the programs while continuing so-called non-stop operation. Accordingly, no burden is imposed on the host 10, and, without the host 10 being conscious thereof, it is possible to perform smooth program updating in a comparatively simple manner and moreover at a low cost, so that the convenience of use is enhanced.

In this embodiment, the cache memories 250A and 250B are synchronized before connecting the host side interior bus 401 to the controller 200B which is the processing delegate. Accordingly, the controller 200B which is entrusted with the delegation of processing is able to perform matching data processing, based on the common information within the cache memory 250B.

In this embodiment, the program on the side of the controller 200A is updated after the access request processing on the side of the controller 200A has been delegated to the controller 200B. Accordingly, it is possible to update the program without stopping the storage control device 100.

It should be understood that a certain time is required for synchronizing the cache memories 250A and 250B. Accordingly, in the common information synchronization processing, it is desirable to shorten the processing time for synchronization by, for example, transferring only the changes which have been updated, and to operate both of the controllers 200A and 200B in the synchronization mode before program updating.

In this embodiment, it is arranged for the changeover processing for the destination of connection of the host side I/F unit 210A and the update control procedure to be performed within the controller 200A which is the object of updating. Accordingly, it is possible to perform updating of the controller 200A without any increase of the burden on the side of the controller 200B to which the processing of access requests is delegated.

In this embodiment, it is arranged for the bus switches 266 to be provided within the data transfer control circuits 260A and 260B, and to change over the destination of connection of the host side I/F unit 210A. Accordingly, there is no increase of the number of components of the controllers 200A and 200B, and it is possible to perform program updating during operation, without stopping.

EMBODIMENT 2

Next, a second embodiment of the present invention will be explained with reference to FIGS. 12 and 13. Each of the embodiments described below, including this second embodiment, may be considered as a variant of the first embodiment. In the following description of these various embodiments, duplication of explanation will be omitted, and the discussion will focus on the distinguishing portion of each embodiment.

In this second embodiment, the execution of program updating from the host 10A is commanded by a so-called inband method. In the first embodiment described above, notification of update commands and the like was provided from the management terminal 20 to the storage control device 100 via the network for management CN13. Such a method is termed an "out-of-band" method. In this embodiment, instead, the updating of programs is commanded using the network CN11 for data input and output.

Figure 12:
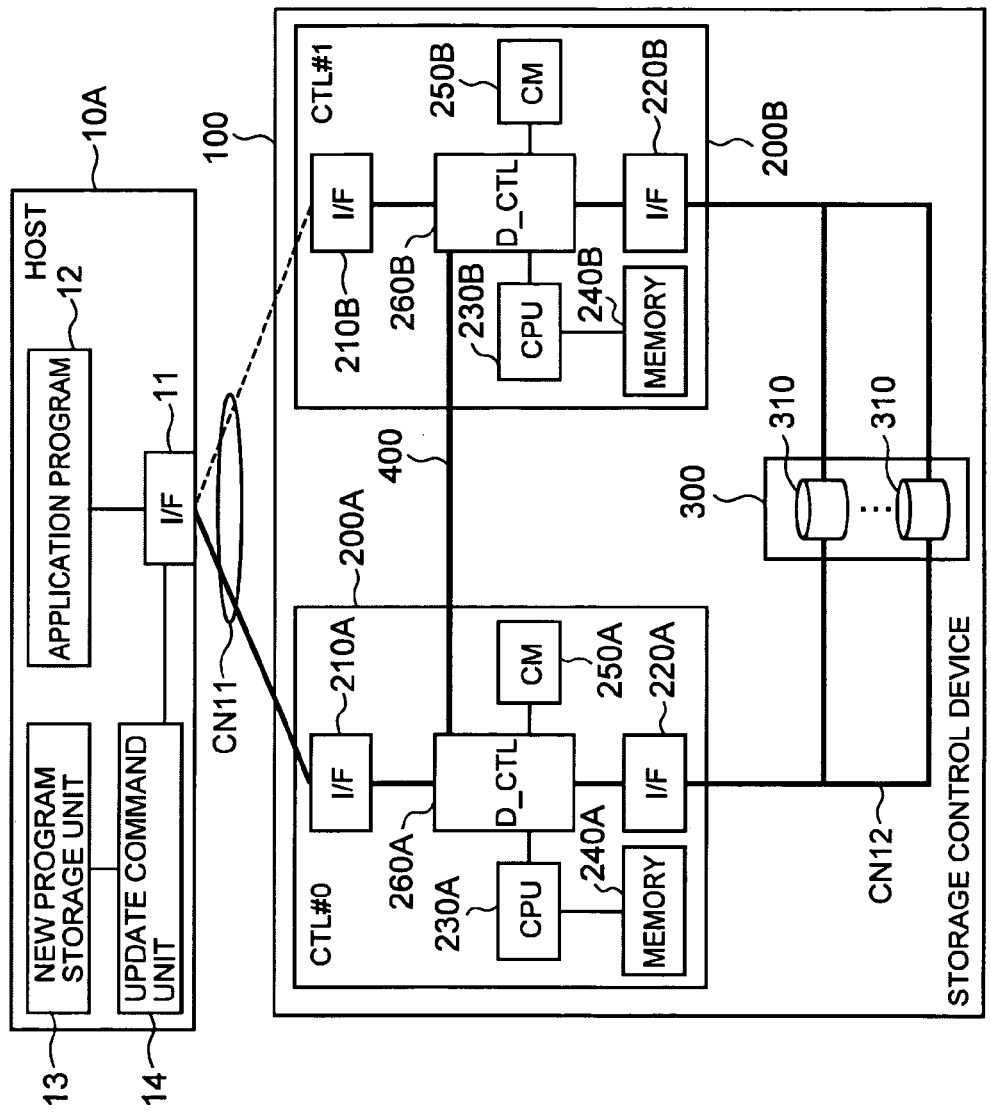
FIG. 12 is an explanatory figure showing the overall structure of a storage system according to the second embodiment.

FIG. 12 is an explanatory figure showing the overall structure of a storage system according to this second embodiment. In this embodiment, all or a portion of the functions of the management terminal 20 are provided within the host 10A. This host 10A comprises at least a new program storage unit 13 and an update command unit 14.

The new program storage unit 13 corresponds to the above described new program storage unit 21 of the first embodiment, while the update command unit 14 corresponds to the above described update command unit 22 of the first embodiment. This new program storage unit 13 is a means for storing a program for updating. And this update command unit 14 is a means for commanding the storage control device 100 to update the program. In this embodiment, the functions of the management terminal 20 are provided in the host 10A, and the network for management CN13 for commanding the updating of programs from the host 10A is eliminated.

Figure 13:
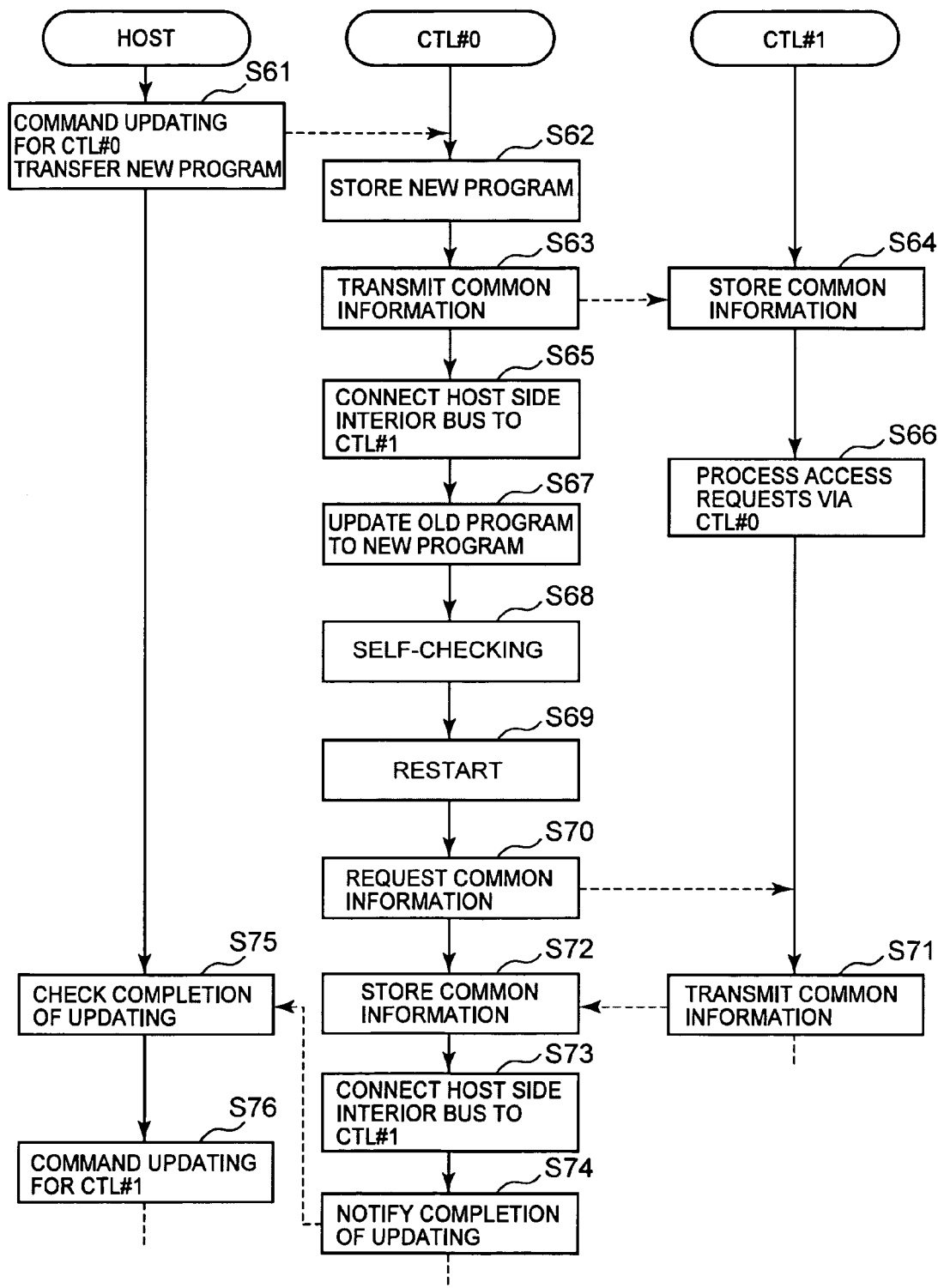
FIG. 13 is a flow chart showing the processing when updating the program.

FIG. 13 is a flow chart showing the update control procedure. The host 10A transmits (in a step S61) an update execution command along with a new program to the controller 200A which is the initial object of program updating (S61). And the controller 200A receives this new program and stores it (in a step S62) in the empty disk 311.

And the controller 200A transfers (in a step S63) the common information which is stored in the cache memory 250A to the cache memory 250B, and makes the stored contents of both of the cache memories 250A and 250B agree with one another (in a step S64). It should be understood that, as described above, if the synchronization mode is already operating, the steps S63 and S64 may be omitted. Furthermore, it would also be possible not to transmit the entire contents of the common information stored in the cache memory 250A to the cache memory 250B, but instead to transmit only the differences with the cache memory 250B thereto.

Next, after having connected (in a step S65) the host side interior bus 401 to the interior bus of the data transfer control circuit 260B of the controller 200B, the controller 200A updates the program (in a step S67). When the connection updating shown in the step S65 has been performed, the controller 200B processes the access request from the host 10A (in a step S66).

After the updating of the program has been completed, the controller 200A performs self-checking processing (in a step S68) and restarts (in a step S69).

The controller 200A requests (in a step S70) the controller 200B to transfer the common information which is stored in the cache memory 250B. And the controller 200B transmits to the controller 200A (in a step S71) the common information, in which the results of data processing during the period that the processing of access requests was delegated is reflected.

The controller 200A reconnects (in a step S73) the host side interior bus 401 to the interior bus of the data transfer control circuit 260A, after the stored contents of the cache memories 250A and 250B have been made to agree with one another. And the controller 200A notifies (in a step S74) the host 10A to the effect that the updating of the program has been completed normally. After the host 10A has checked the completion of updating of the program on the side of the controller 200A (in a step S75), next, it commands program updating (in a step S76) to the controller 200B, which should be updated. And, subsequently, the same processes as in the steps S62 through S75 above are performed.

This embodiment with this type of structure also furnishes the same beneficial operational effects as the first embodiment described above. In addition, since, with this embodiment, along with providing the management function within the host 10A, also the updating execution is commanded with the inband method, accordingly it is possible to eliminate the management terminal 20 and the network for management CN13, so that it is possible to simplify the entire structure.

EMBODIMENT 3

A third embodiment of the present invention will now be explained with reference to FIG. 14. In this third embodiment, the management function 15 for managing the updating of the program is provided to the host 10B. However, the point of difference from the second embodiment described above, is that the updating commands and so on are transmitted to the storage control device 100 via the network for management CN13.

Figure 14:
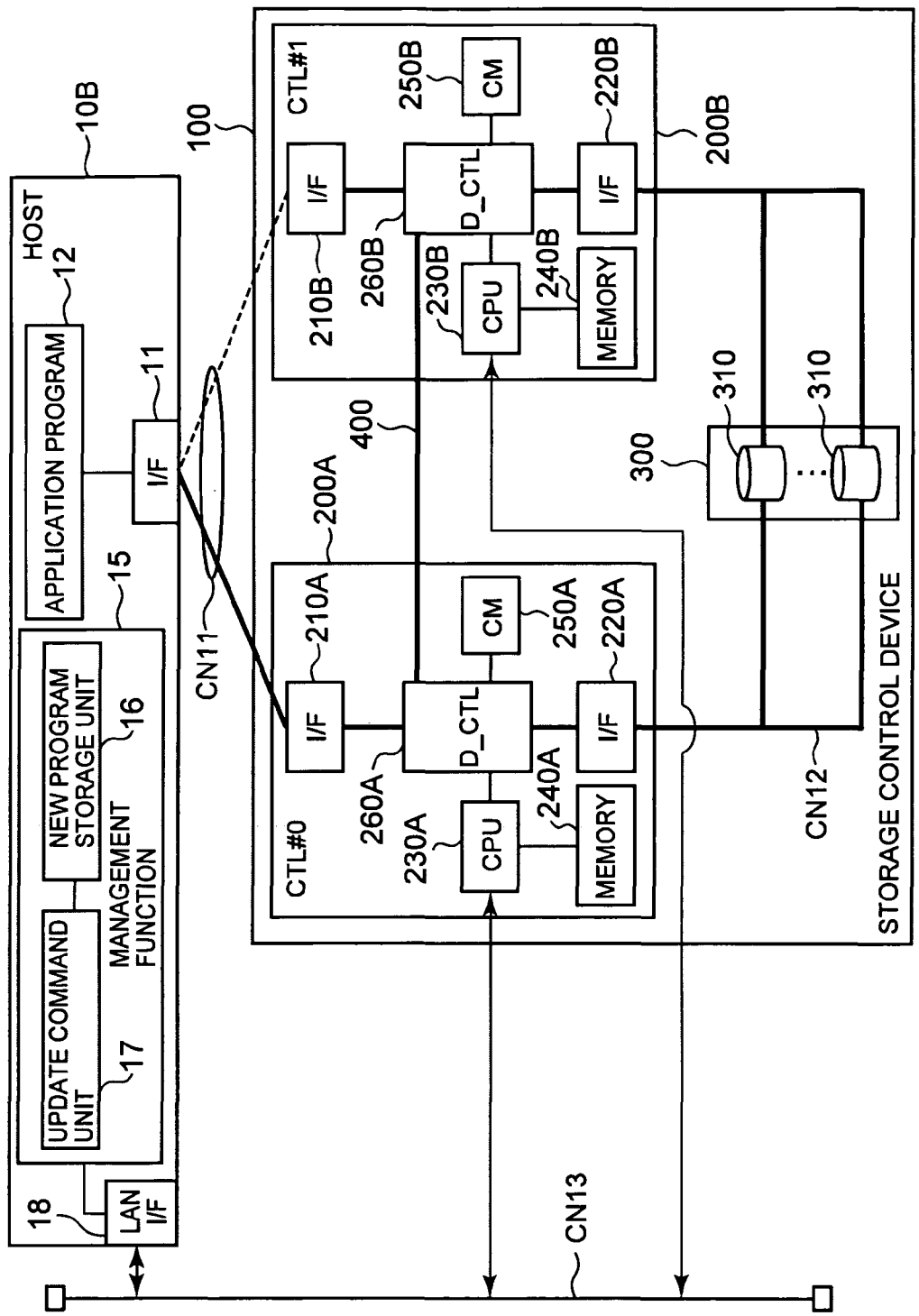
FIG. 14 is a an explanatory figure showing the overall structure of a storage system according to the third embodiment.

FIG. 14 is an explanatory figure showing the overall structure of a storage system according to this third embodiment. The host 10B is provided with a management function 15. To this management function 15, there are provided a new program storage unit 16 for storing the new program, and an update command unit 17 for commanding the updating of the program. And this management function 15 is connected to the network for management CN13 via a LAN I/F 18. The operation of this embodiment is the same as that of the first embodiment. However, the exchange of information related to program updating is performed between the management function 15 and each of the controllers 200A and 200B.

This embodiment with this type of structure also furnishes the same beneficial operational effects as the first embodiment described above. In addition, since, with this embodiment, the management function 15 is provided within the host 10B, accordingly it is possible to eliminate the management terminal 20, so that it is possible to simplify the entire structure. Furthermore, since the commands related to updating are performed using the network for management CN13, accordingly the transfer of the update command and of the program for updating does not exert any influence on normal data input and output.

EMBODIMENT 4

A fourth embodiment of the present invention will now be explained with reference to FIGS. 15 and 16. In this fourth embodiment, the updating period for the program is controlled based on the priority level for updating the program, and on the state of the storage control device 100.

Figure 15:
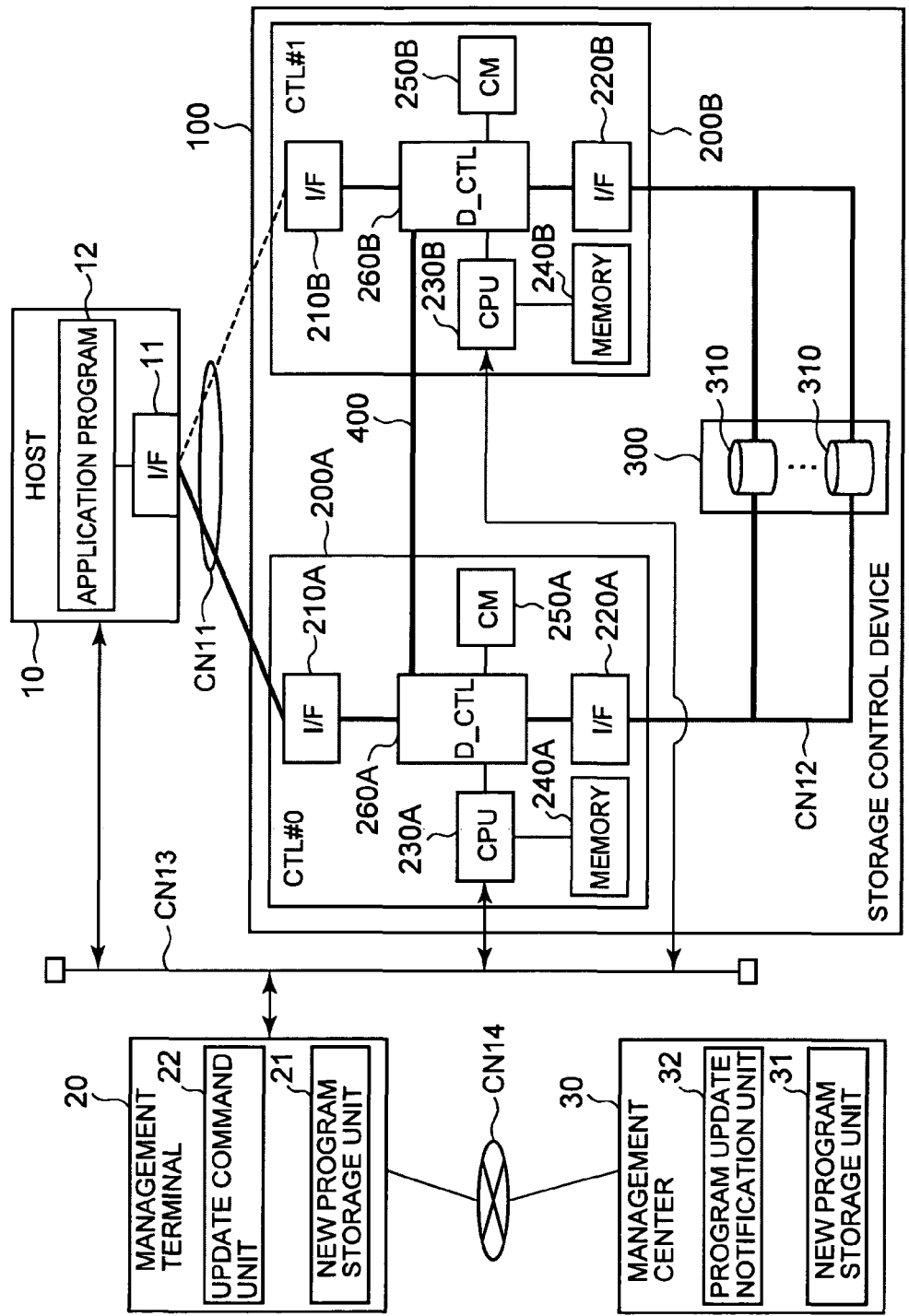
FIG. 15 is an explanatory figure showing the overall structure of a storage system according to the fourth embodiment.

FIG. 15 is an explanatory figure showing the overall structure of a storage system according to this fourth embodiment. In addition to the structures described in the first embodiment, this storage system further comprises a management center 30.

This management center 30 is a computer device for managing program output of the storage control device 100 in a unified manner. The management center 30 is connected to the management terminal 20 via a communication network CN14 such as, for example, a WAN (Wide Area Network). It should be understood that although, in the figure, the management center 30 is only shown as being connected to a single management terminal 20, actually it could be connected to each of a plurality of management terminals. Furthermore, the communication network CN13 can serve as the communication network CN14.

The management center 30 may comprise a new program storage unit 31 and a program update notification unit 32. The new program storage unit 31 stores a new program for updating. And the program notification unit 32 notifies the management terminal 20 to the effect that it is necessary to update to the new program.

Figure 16:
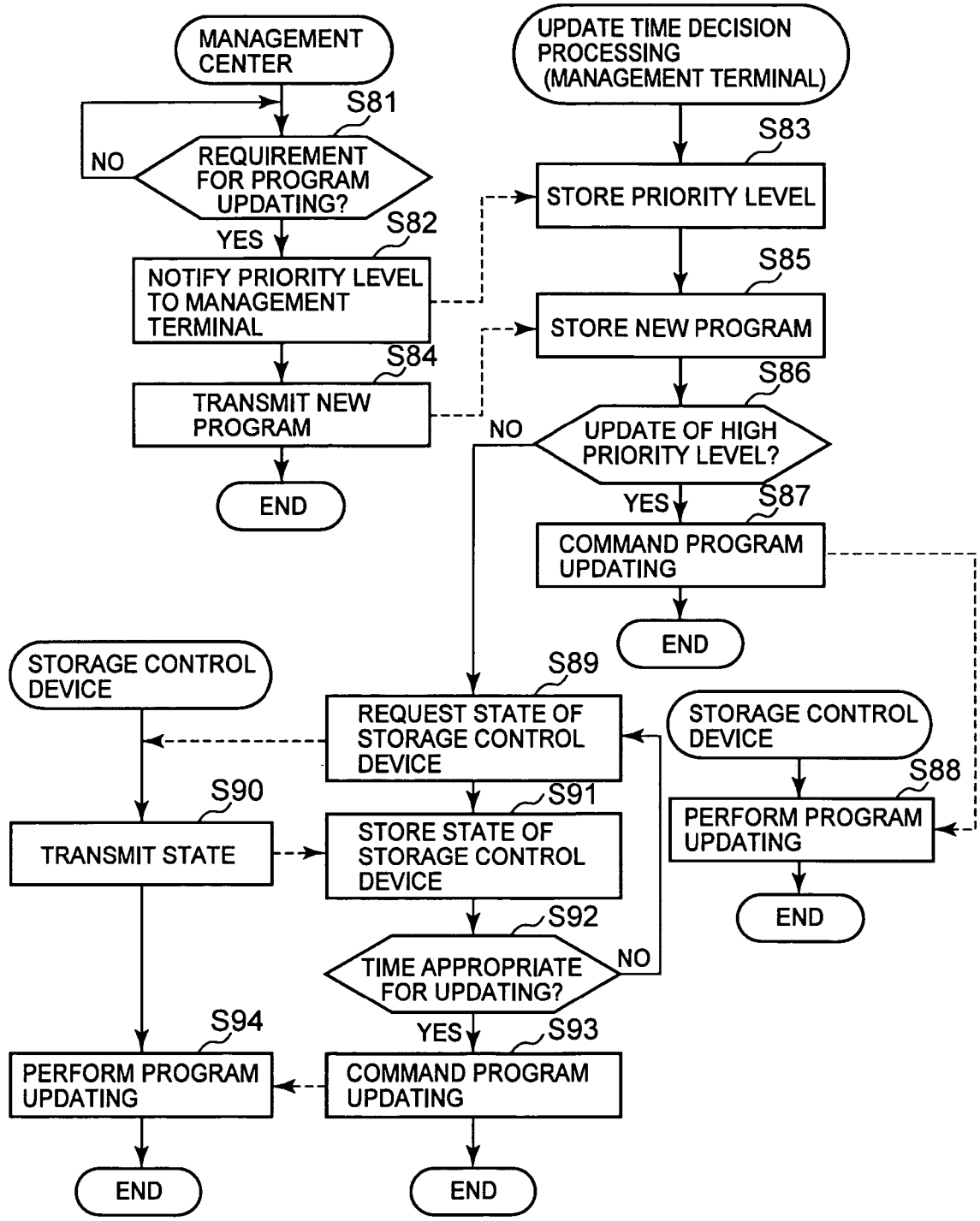
FIG. 16 is a flow chart showing the processing for deciding on update execution timing.

FIG. 16 is a flow chart showing the flow of control of an updating execution period decision process for controlling the execution timing of the update control procedure. If it has been decided that a requirement for program updating has occurred (S81: YES), then the management center 30 notifies the management terminal 20 (in a step S82) to the effect that the program ought to be updated, and of the priority level of the update. If, for example, the program update relates to an improvement of security, then a comparatively high priority level will be set. However, if the program update relates to an improvement in data processing performance, then a comparatively low priority level will be set.

The management terminal 20 checks that a requirement for program updating has occurred, and stores the priority level of this program update (in a step S83). And the management center 30 reads out the new program from the new program storage unit 31, and transmits it (in a step S84) to the management terminal 20. The management terminal 20 stores the new program which it has received from the management center 30 in the new program storage unit 21 (in a step S85).

The management terminal 20 compares together the priority level of the program update which has been notified from the management center 30 and a predetermined threshold value which is set in advance, and decides whether or not this priority level is greater than a predetermined threshold value (in a step S86). If the priority level is greater than the predetermined threshold value (S86: YES), then the management terminal 20 commands (in a step S87) program updating execution to the storage control device 100 (the controller 200A which is initially upgraded). Due to this, the storage control device 100 executes (in a step S88) the update control procedure described in FIG. 10.

On the other hand, if the priority level for program updating is less than or equal to the predetermined threshold value (S86: NO), then this is a program update of low urgency. Thus, the management terminal 20 requests the storage control device 100 to transfer the state of the storage control device 100 (in a step S89). By the state of the storage control device 100 is meant, for example, the load state of the storage control device 100. It is possible to decide on the load state, for example, from the number of access requests per unit time (IOPS), from the usage ratios of the cache memories 250A and 250B, or from the usage ratios of the processors 230A and 230B or the like.

The storage control device 100 transmits its own state to the management terminal 20 (in a step S90). The management terminal 20 stores this state of the storage control device 100 (in a step S91). And the management terminal 20 decides (in a step S92), based on the state of the storage control device 100, whether or not this is an appropriate time to execute program updating.

For example, the load state of the storage control device 100 becomes heavy in a case such as when the storage control device 100 is processing a large number of access requests, or when it is executing backup processing to a tape device. In this case, it is not appropriate to perform a program update whose urgency is low. By contrast, if the load state of the storage control device 100 is light, then there will be no inconvenience even if program updating is performed.

If it has been decided that the timing is appropriate for execution of program updating (S92: YES), then the management terminal 20 commands the storage control device 100 to perform updating of the program (in a step S93). Due to this, the storage control device 100 performs program updating (in a step S94).

On the other hand, if it has been decided that the timing is not appropriate for execution of program updating (S92: NO), then the management terminal 20 acquires the state of the storage control device 100 again (in a step S89), after having, for example, waited until a predetermined time period has elapsed. In this manner, the management terminal 20 issues the updating command to the storage control device 100 by deciding for itself the most appropriate timing for updating the program.

This fourth embodiment with this type of structure furnishes the same beneficial effects as the first embodiment. In addition since, with this fourth embodiment, the update period is selected based on the priority level of the program update and the state of the storage control device 100, accordingly it is possible to update the program when the load on the storage control device 100 is light, and thus it is possible to update the program smoothly while preventing decrease of performance of the storage system.

EMBODIMENT 5

Figure 17:
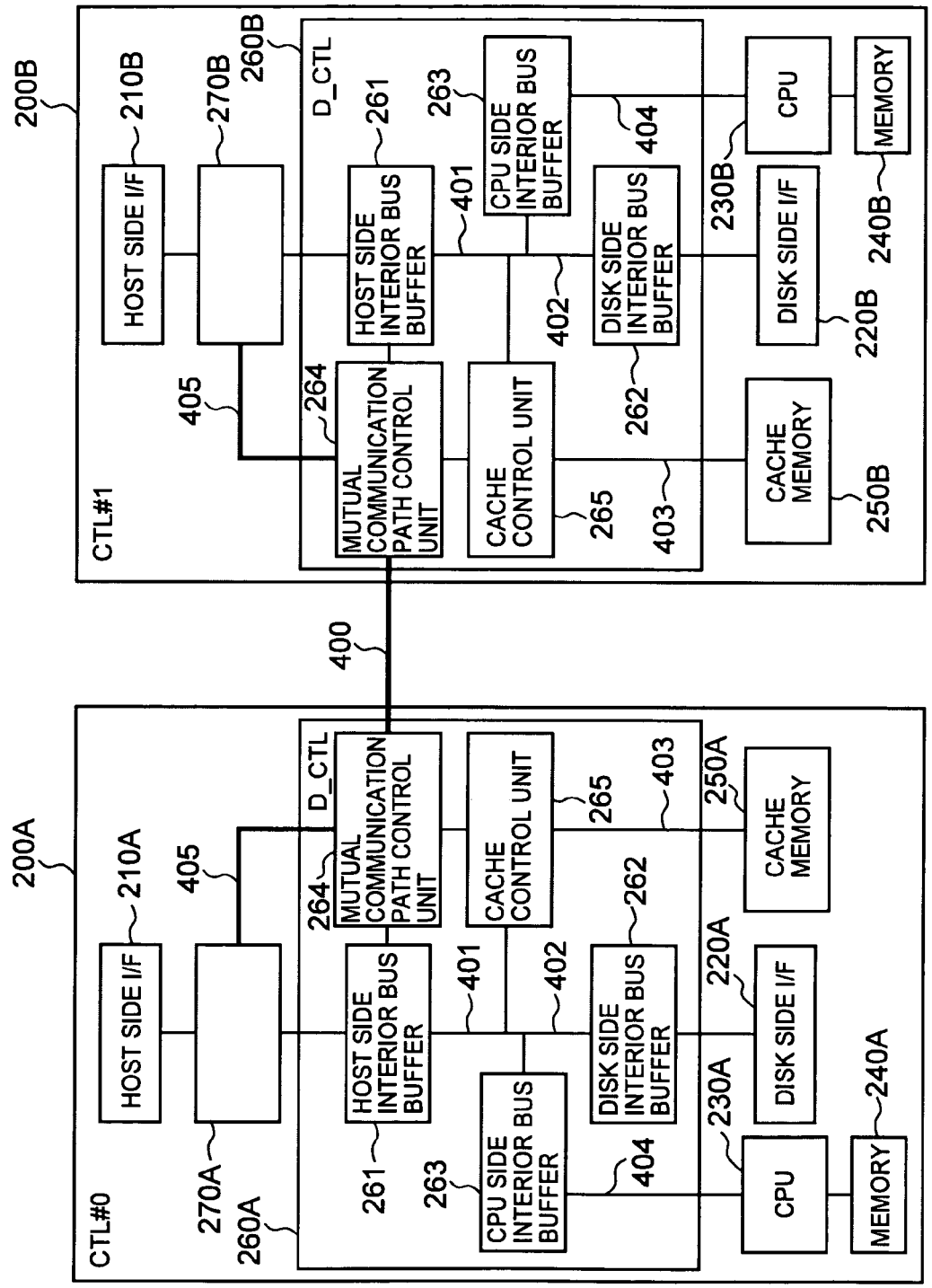
FIG. 17 is an explanatory figure showing the overall structure of a storage system according to the fifth embodiment.

A fifth embodiment of the present invention will now be explained with reference to FIG. 17. As shown in the block diagram of FIG. 17, with this fifth embodiment, the bus switches 266 are eliminated from the data transfer control circuits 260A and 260B, and path changeover switches 270A and 270B are provided exterior to the data transfer control circuits 260A and 260B.

These path changeover switches 270A and 270B are each connected to the mutual communication path control unit 264 via the bus 405. The path changeover switches 270A and 270B are endowed with a normal mode and an updating mode, just as the bus switches 266 were. In the case of the normal mode, the host side I/F unit 210A is connected to the data transfer control circuit 260A, while the host side I/F unit 210B is connected to the data transfer control circuit 260B. On the other hand, when the path changeover switch 270A is in the updating mode, the host side I/F unit 210A is connected via the bus 405 and the mutual communication path 400 to the data transfer control circuit 260B. In the same manner, when the path changeover switch 270B is in the updating mode, the host side I/F unit 210B is connected via the bus 405 and the mutual communication path 400 to the data transfer control circuit 260A. This fifth embodiment with this type of structure furnishes the same beneficial effects as the first embodiment.

It should be understood that the present invention is not limited to the above described embodiments. A person skilled in the art can make various additions and changes to the present invention, without departing from its scope.

What is claimed is:

1. A storage control device comprising a plurality of controllers, wherein
    each of said controllers comprises:
    a host communication control unit for performing communication with a host device;
    a subordinate communication control unit for performing communication with a plurality of storage devices which store data used by said host device;
    a cache memory for temporarily storing data transmitted from said host communication control unit;
    an access request processing unit which, when an access request has been received from said host device via said host communication control unit, processes said access request by accessing said plurality of storage devices via said subordinate communication control unit, and by executing predetermined data processing based on control program; and
    a program storage unit which stores said control program corresponding to said access request processing unit, in which said access request processing unit needs to restart after updating the control program;
    said storage control device further comprising:
    a mutual communication path for connecting said controllers;
    an update control unit for updating said control program which is stored in said program storage unit; and
    a processing path changeover unit connecting said host communication control unit and said access request processing unit, which changes over between:
    (1) a normal mode in which said host communication control unit and said access request processing unit are respectively connected in each said controller; and
    (2) an updating mode in which said host communication control unit of one controller is connected via said mutual communication path to said access request processing unit of another controller; and,
    wherein
    when updating said control program that said program storage unit in said one controller stores, data in the cache memory within said one controller is sent to the cache memory within said other controller;
    based on a command from said update control unit, said processing path changeover unit changes over said normal mode to said updating mode and processes said access request received by said host communication control unit of said one controller by means of said access request processing unit of said other controller.

2. The storage control device according to claim 1, further comprising a data synchronization unit which synchronizes stored contents in said cache memory of said one controller and stored contents in said cache memory of said other controller.

3. The storage control device according to claim 1, wherein, when the stored contents in said cache memory of said one controller and the stored contents in said cache memory of said other controller have been synchronized, said update control unit connects said host communication control unit of said one controller to said access request processing unit of said other controller via said mutual communication path by said processing path changeover unit.

4. The storage control device according to claim 1, wherein said update control unit updates said control program which is stored in said program storage unit of said one controller, when said host communication control unit of said one controller is connected, by said processing path changeover unit, to said access request processing unit of said other controller via said mutual communication path.

5. The storage control device according to claim 4, wherein when the updating of said control program has been completed, said update control unit reconnects said host communication control unit of said one controller to said access request processing unit comprised in said one controller by said processing path changeover unit, after resynchronizing the stored contents in said cache memory of said one controller and the stored contents in said cache memory of said other controller.

6. The storage control device according to claim 1, wherein said processing path changeover unit and said update control unit operate within said one controller in which the updating of said control program is performed.

7. The storage control device according to claim 1, further comprising an update program storage unit for storing a program for updating, which is used for updating said control program.

8. The storage control device according to claim 1, wherein said update control unit updates said control program when execution of updating has been commanded.

9. The storage control device according to claim 1, wherein, when the execution of updating has been commanded, said update control unit receives and stores a program for updating which is used for updating said control program, after connecting, by said processing path changeover unit, said host communication control unit of said one controller to said access request processing unit of said other controller via said mutual communication path.

10. The storage control device according to claim 1, wherein, when the execution of updating has been commanded, said update control unit receives and stores a program for updating which is used for updating said control program, before connecting, by said processing path changeover unit, said host communication control unit of said one controller to said access request processing unit of said other controller via said mutual communication path.

11. The storage control device according to claim 1, wherein said update control unit updates said control program immediately if the priority level set for a program for updating to update said control program is higher than a predetermined threshold value, while updating said control program based on the states of said controllers if the priority level set for said program for updating is equal to or less than said predetermined threshold value.

12. The storage control device according to claim 1, wherein said update control unit is commanded to execute updating from said host device, or from a management device which is different from said host device.

13. The storage control device according to claim 1, wherein said controllers are all provided within the same casing and constitute a redundant structure, and said mutual communication path is provided within said casing.

14. A storage system comprising:
a storage control device including a plurality of controllers, wherein
each of said controllers comprises:
a host communication control unit for performing communication with a host device;
a subordinate communication control unit for performing communication with a plurality of storage devices which store data used by said host device;
a cache memory for temporarily storing data transmitted from said host communication control unit;
an access request processing unit which, when an access request has been received from said host device via said host communication control unit, processes said access request by accessing said plurality of storage devices via said subordinate communication control unit, and by executing predetermined data processing based on control program; and
a program storage unit which stores said control program corresponding to said access request processing unit, in which said access request processing unit needs to restart after updating the control program;
said storage control device further comprising:
a mutual communication path for connecting said controllers;
an update control unit for updating said control program which is stored in said program storage unit; and
a processing path changeover unit connecting said host communication control unit and said access request processing unit, which changes over between:
(1) a normal mode in which said host communication control unit and said access request processing unit are respectively connected in each said controller; and
(2) an updating mode in which said host communication control unit of one controller is connected via said mutual communication path to said access request processing unit of another controller; and,
wherein
when updating said control program that said program storage unit in said one controller stores, data in the cache memory within said one controller is sent to the cache memory within said other controller;
based on a command from said update control unit, said processing path changeover unit changes over said normal mode to said updating mode and processes said access request received by said host communication control unit of said one controller by means of said access request processing unit of said other controller.

15. A storage control device comprising a plurality of controllers, wherein
each of said controllers comprises:
a host communication control unit for performing communication with a host device;
a subordinate communication control unit for performing communication with a plurality of storage devices which store data used by said host device;
a cache memory for temporarily storing data transmitted from said host communication control unit;
an access request processing unit which, when an access request has been received from said host device via said host communication control unit, processes said access request by accessing said plurality of storage devices via said subordinate communication control unit, and by executing predetermined data processing based on a control program, where said access request processing unit needs to reboot itself to effect any updating of said control program; and
a program storage unit which stores the control program corresponding to said access request processing unit;
said storage control device further comprising:
a mutual communication path for connecting said controllers;
an update control unit for updating said control program which is stored in said program storage unit; and
a processing path changeover unit connecting said host communication control unit and said access request processing unit, which changes over between:
(1) a normal mode in which said host communication control unit and said access request processing unit are respectively connected in each said controller; and
(2) an updating mode in which said host communication control unit of one controller is connected via said mutual communication path to said access request processing unit of another controller; and,
wherein when updating said access request processing unit with an updated said control program,
data in the cache memory within said one controller is sent to the cache memory within said other controller;
based on a command from said update control unit, said processing path changeover unit changes over said normal mode to said updating mode and processes said access request received by said host communication control unit of said one controller by means of said access request processing unit of said other controller, and
said access request processing unit reboots itself using the updated said control program while said other controller processes said access request received by said host communication control unit of said one controller.

* * * * *